US012772191B2

(12) United States Patent
Kawasaki et al.

(10) Patent No.: US 12,772,191 B2
(45) Date of Patent: Oct. 20, 2026

(54) USER EQUIPMENT (UE) AND COMMUNICATION CONTROL METHOD

(71) Applicant: SHARP KABUSHIKI KAISHA, Sakai City (JP)

(72) Inventors: Yudai Kawasaki, Sakai City (JP); Masafumi Aramoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 425 days.

(21) Appl. No.: 18/029,652

(22) PCT Filed: Sep. 27, 2021

(86) PCT No.: PCT/JP2021/035293
§ 371 (c)(1),
(2) Date: Mar. 30, 2023

(87) PCT Pub. No.: WO2022/071198
PCT Pub. Date: Apr. 7, 2022

(65) Prior Publication Data

US 2023/0397147 A1 Dec. 7, 2023

(30) Foreign Application Priority Data

Oct. 1, 2020 (JP) ................................. 2020-166658

(51) Int. Cl.
*H04W 60/04* (2009.01)
*H04W 60/06* (2009.01)

(52) U.S. Cl.
CPC ........... *H04W 60/04* (2013.01); *H04W 60/06* (2013.01)

(58) Field of Classification Search
None
See application file for complete search history.

(56) References Cited

U.S. PATENT DOCUMENTS

2020/0396792 A1* 12/2020 Tiwari .............. H04W 36/0085
2021/0250890 A1* 8/2021 Won ....................... H04W 60/04
2021/0360569 A1* 11/2021 Park ........................ H04W 8/02
2022/0353680 A1* 11/2022 Hu ...................... H04L 63/0892
(Continued)

OTHER PUBLICATIONS

3GPP TS 23.501 V16.6.0 (Sep. 2020) 3rd Generation Partnership Project; Technical Specification Group Services and System Aspects; System architecture for the 5G System (5GS); Stage 2 (Release 16).
(Continued)

*Primary Examiner* — Christine T Duong
(74) *Attorney, Agent, or Firm* — ScienBiziP, P.C.

(57) ABSTRACT

In a 5G System (5GS), control processing of a control apparatus in a core network and control processing of a User Equipment (UE) in a case that the UE does not store information related to a Non-Public Network (NPN) even though the UE needs to be connected to and registered with the NPN are not clarified. Provided are a communication unit for providing the UE with information of the Non-Public Network (NPN) and control processing in a case that the UE needs to connect to and be registered with the NPN in the 5G System (5GS). Further provided are a communication unit and control processing in a case that provision of the information of the NPN for the UE fails in the 5GS.

3 Claims, 10 Drawing Sheets

(56) References Cited

U.S. PATENT DOCUMENTS

| | | | | |
|---|---|---|---|---|
| 2023/0156457 A1* | 5/2023 | Liu | H04W 60/04 | 455/418 |
| 2023/0199632 A1* | 6/2023 | Talebi | H04W 48/10 | 455/434 |

OTHER PUBLICATIONS

3GPP TS 23.502 V16.6.0 (Sep. 2020) 3rd Generation Partnership Project; Technical Specification Group Services and System Aspects; Procedures for the 5G System (5GS); Stage 2 (Release 16).

3GPP TS 24.501 V17.0.0 (Sep. 2020) 3rd Generation Partnership Project; Technical Specification Group Core Network and Terminals; Non-Access-Stratum (NAS) protocol for 5G System (5GS); Stage 3; (Release 17).

3GPP TR 23.700-07 V1.0.0 (Sep. 2020) 3rd Generation Partnership Project; Technical Specification Group Services and System Aspects; Study on enhanced support of non-public networks (Release 17).

* cited by examiner

USER EQUIPMENT (UE) AND COMMUNICATION CONTROL METHOD

TECHNICAL FIELD

The present disclosure relates to a User Equipment (UE) and a communication control method. This application claims priority to JP 2020-166658 filed on Oct. 1, 2020, the contents of which are incorporated herein by reference.

BACKGROUND ART

In the 3rd Generation Partnership Project (3GPP), study on system architecture of a 5G System (5GS) being a mobile communication system of the next generation, that is, the fifth generation (5G), is underway, and support of new procedures and new functions is being discussed (see NPL 1, NPL 2, NPL 3, and NPL 4).

For example, requirement conditions include optimization and diversification of communication procedures for supporting continual mobile communication services according to various services, optimization of system architecture in accordance with the optimization and the diversification of the communication procedures, and the like.

CITATION LIST

Non Patent Literature

NPL 1: 3GPP TS 23.501 v16.6.0 (2020 September); Technical Specification Group Services and System Aspects; System Architecture for the 5G System; Stage 2 (Release 16)

NPL 2: 3GPP TS 23.502 v16.6.0 (2020 September); Technical Specification Group Services and System Aspects; Procedures for the 5G System; Stage 2 (Release 16)

NPL 3: 3GPP TS 24.501 v17.0.0 (2020 September); Technical Specification Group Core Network and Terminals; Non-Access-Stratum (NAS) protocol for 5G System (5GS); Stage 3 (Release 17)

NPL 4: 3GPP TR 23.700-07 v1.0.0 (2020 September); Technical Specification Group Services and System Aspects; Study on enhanced support of non-public networks (Release 17)

SUMMARY OF INVENTION

Technical Problem

For the 5G System (5GS), in order to provide various services, a 5G Core Network (5GCN), which is a new core network, is under study. Note that, for the 5GS, provision of a non-public network that can be used by a specific user for a specific purpose, such as a Non-Public Network (NPN), which is defined separately from a Public Land Mobile Network (PLMN) being a public network, and functions for implementing the non-public network are under study as well.

However, processing of a control apparatus in a core network and processing of a User Equipment (UE) in a case that the UE does not store information related to the NPN even though the UE needs to be connected to and registered with the NPN is not clarified.

An aspect of the present invention is made in view of the circumstances as described above, and an object of the present invention is to provide a communication unit for providing information of an NPN for a UE in a case that the UE needs to connect to and be registered with the NPN in a 5GS, and a method of implementing processing of a control apparatus in a core network and processing of a UE. In addition, another object is to provide a communication unit and a method of implementing processing of the control apparatus in the core network and processing of the UE in a case that provision of the information of the NPN for the UE fails in the 5GS.

Solution to Problem

A User Equipment (UE; terminal apparatus) according to an aspect of the present invention includes: a transmission and/or reception unit configured to receive a registration accept message including first information from a control apparatus; and a controller. The first information is capability information indicating that a network supports registration in which only an onboarding service is available. Based on the first information, the controller configures the transmission and/or reception unit to not allow a PDU session establishment procedure for an operation other than the onboarding service to be initiated. In addition, a User Equipment (UE; terminal apparatus) according to an aspect of the present invention includes: a transmission and/or reception unit configured to receive a registration accept message including first information from a control apparatus in a registration procedure; and a controller. The first information is information indicating a type of SNPN information provision procedure supported by a network. Based on the first information, the controller determines whether to initiate PDU session establishment.

A communication control method for a User Equipment (UE; terminal apparatus) according to an aspect of the present invention includes the step of receiving a registration accept message including first information from a control apparatus. The first information is capability information indicating that a network supports registration in which only an onboarding service is available. Based on the first information, configuration is performed to not allow a PDU session establishment procedure for an operation other than the onboarding service to be initiated.

Advantageous Effects of Invention

According to an aspect of the present invention, in a 5GS, even in a case that a UE does not store information related to an NPN, a communication unit, control processing of a control apparatus in a core network, and control processing of the UE for enabling the UE to be connected to and registered with the NPN can be implemented.

DESCRIPTION OF EMBODIMENTS

With reference to the drawings, the best embodiments for carrying out an aspect of the present invention will be described.

1. Overview of System

Figure 1:
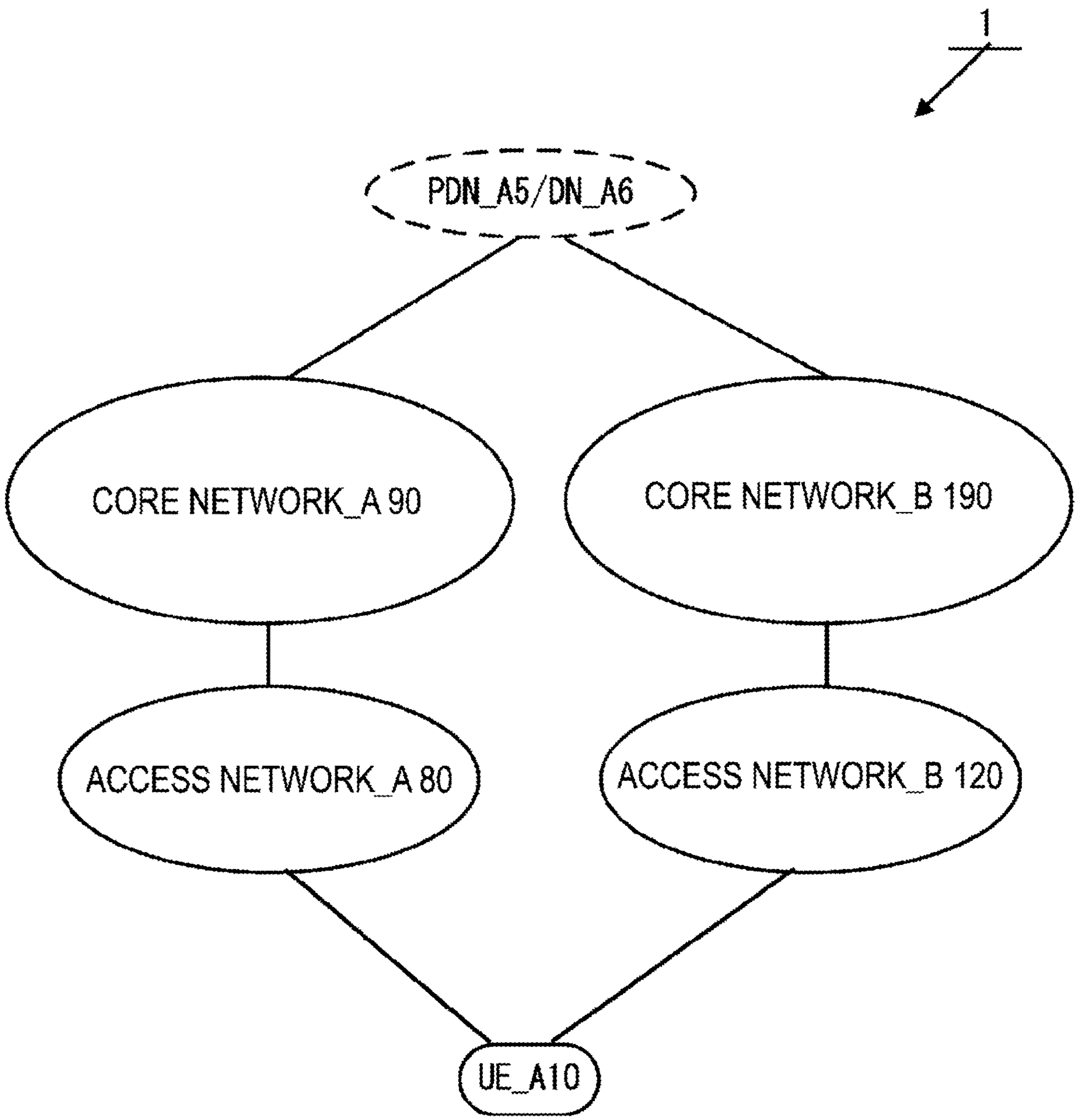
FIG. 1 is a diagram illustrating an overview of a mobile communication system (EPS/5GS).
Figure 2:
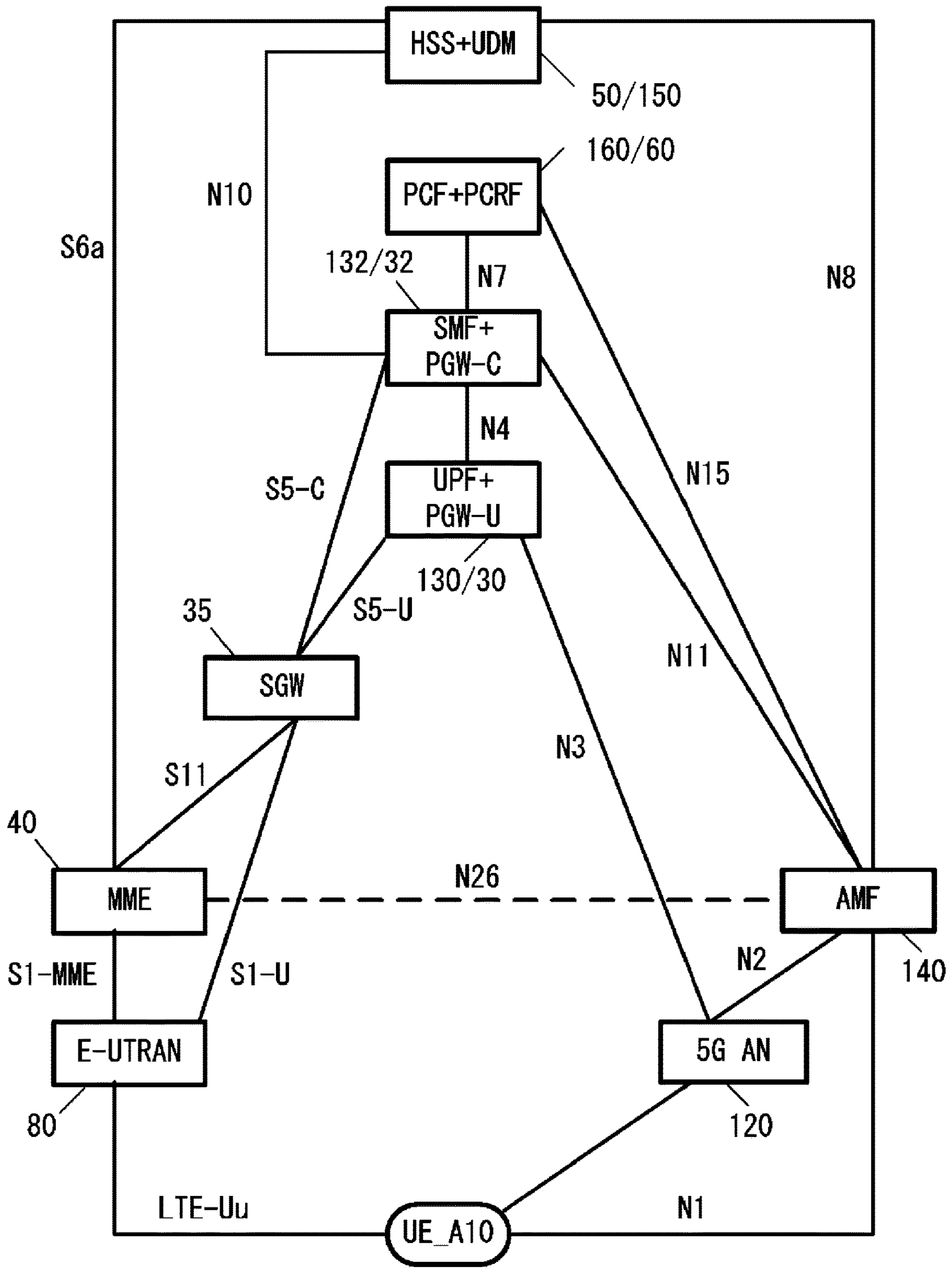
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

FIG. 2 illustrates apparatuses and functions such as a UE_A 10, an E-UTRAN 80, an MIME 40, an SGW 35, a PGW-U 30, a PGW-C 32, a PCRF 60, an HSS 50, a 5G AN 120, an AMF 140, a UPF 130, an SMF 132, a PCF 160, and a UDM 150, and interfaces for connecting these apparatuses and functions to each other.

In the following, regarding these apparatuses and functions, the symbols may be omitted in description, such in as a UE, an E-UTRAN, an MME, an SGW, a PGW-U, a PGW-C, a PCRF, an HSS, a 5G AN, an AMF, a UPF, an SMF, a PCF, and a UDM.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted, such as in an eNB. The gNB is a node that provides a New Radio (NR) user plane and control plane to the UE, and is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following, the core network_A, and/or the core network_B, an apparatus included in the core network_A, and/or an apparatus included in the core network_B may be referred to as a core network or a core network apparatus.

The core network (the core network_A and/or the core network_B) may refer to an IP mobile communication network operated by a mobile communication operator (Mobile Network Operator MNO)) connecting the access network (the access network_A and/or the access network_B) and the PDN and/or the DN, may refer to a core network for a mobile communication operator that operates and manages the mobile communication system 1, or may be a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. Each IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
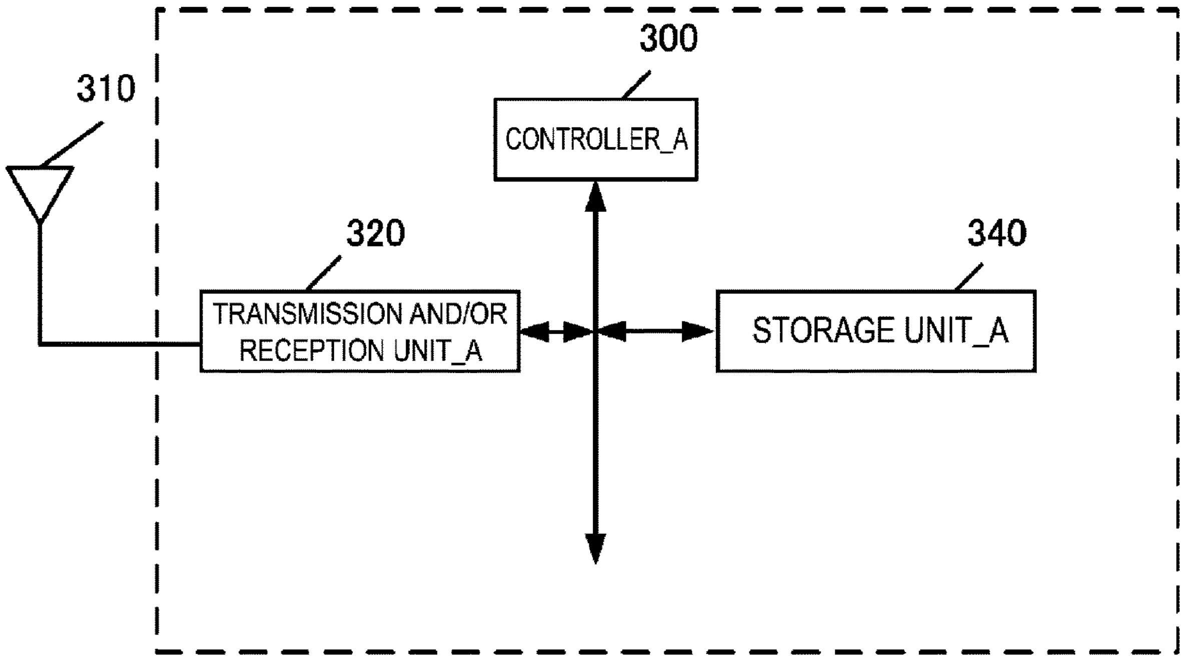
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Following is a detailed description with reference to FIG. 2. With the use of the transmission and/or reception unit_A 320, the UE can communicate with the base station apparatus (eNB) in the E-UTRAN over the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF over the N1 interface with the use of the transmission and/or reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

2.2. Apparatus Configuration of gNB

Figure 4:
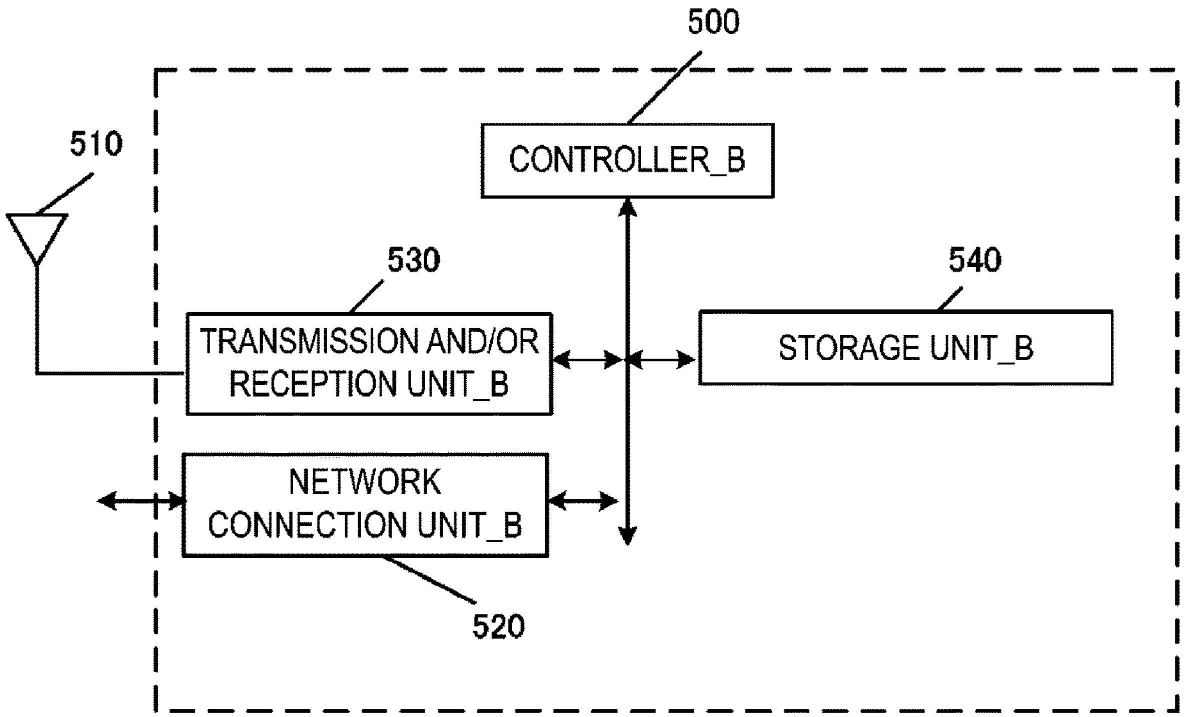
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Following is a detailed description with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
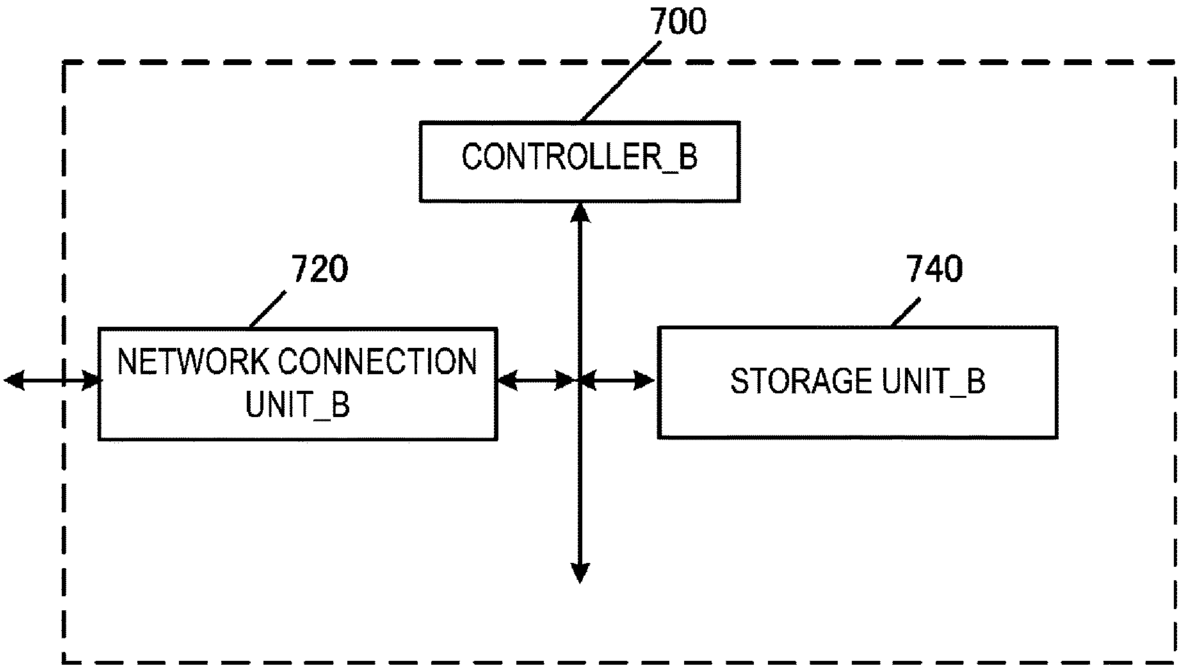
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB) in the 5G AN, and/or the SMF, and/or the PCF, and/or the UDM, and/or the SCEF. In other words, with the use of the network connection unit_B 720, the AMF can transmit and/or receive user data and/or control information to and/or from the base station apparatus (gNB) in the 5G AN, and/or the SMF, and/or the PCF, and/or the UDM, and/or the SCEF.

Following is a detailed description with reference to FIG. 2. With the use of the network connection unit_A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is in 5GMM-REGISTERED, the UE_A 10 may start transmission and/or reception of user data and a control message, or may respond to paging. In addition, note that, in a case that each apparatus is in 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is in 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) nor connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus and/or a function deployed between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

The following is a detailed description with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF via the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB) in the 5G AN, and/or the SMF, and/or the DN. In other words, with the use of the network connection unit_B 720, the UPF can transmit and/or receive user data and/or control information to and/or from the base station apparatus (gNB) in the 5G AN, and/or the SMF, and/or the DN.

The following is a detailed description with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions

Next, other apparatuses and/or functions will be described.

The PCF has a function of providing a policy rule and the like.

The UDM has an authentication information processing (Authentication credential processing) function, a user identification processing function, an access authentication function, a registration/mobility management function, a subscriber information management (subscription management) function, and the like.

The PCRF is connected to the PGW and/or the PDN, and has a function of performing QoS management for data delivery and the like. For example, the PCRF performs management of the QoS of a communication path between the UE_A 10 and the PDN. In addition, the PCRF may be an apparatus that creates and/or manages a Policy and Charging Control (PCC) rule and/or a routing rule used by each apparatus at the time of transmitting and/or receiving user data.

The HSS is connected to the MME and/or the SCEF, and has a function of performing management of subscriber information and the like. The subscriber information of the HSS is referred to in a case of, for example, access control of the MME. In addition, the HSS may be connected to a location management apparatus different from the MME.

The SCEF is connected to the DN and/or the PDN, the MME, and the HSS, and has a function as a relay apparatus that transfers user data as a gateway connecting the DN and/or the PDN and the core network_A and the like. Note that the SCEF may be a gateway for non-IP communication. In addition, the SCEF may have a function of converting non-IP communication and IP communication. Multiple such gateways may be deployed in the core network_A. The SCEF may be configured either outside or inside the core network.

3. Description of Terms, Pieces of Identification Information, and Procedures Used in Each Embodiment Terms, pieces of identification information, and procedures, at least one of which is used in each embodiment, will be described in advance.

3.1. Description of Terms and Pieces of Identification Information Used in Each Embodiment First, highly technical terms and pieces of identification information used in procedures that are used in each embodiment will be described in advance.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

In addition, the network may refer to a Public Land Mobile Network (PLMN), or may refer to an NPN to be described later. In addition, the expression "the UE performs network selection" may mean that the UE performs PLMN selection, or may mean that the UE performs SNPN selection.

A registered PLMN is a PLMN with which the UE is registered.

An equivalent PLMN is a PLMN regarded as a PLMN the same as any PLMN in the network. For example, the equivalent PLMN may be one or multiple PLMNs regarded as being the same as the registered PLMN.

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240. In addition, the SM message may include a PDU session establishment request message, a PDU session establishment accept message, a PDU session complete message, a PDU session reject message, a PDU session modification request message, a PDU session modification accept message, a PDU session modification response message, and the like. The procedure for SM may include a PDU session establishment procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non-EPS service.

A single registration mode is a mode in which the UE_A 10 maintains a common registered state for the 5GMM state and an EMM state in a case that the UE_A 10 can use an N1 mode and an S1 mode.

A dual registration mode is a mode in which the UE_A 10 maintains a registered state with the 5GMM state and the EMM state being independent of each other in a case that the UE_A 10 can use the N1 mode and the S1 mode. Note that, in a case of the dual registration mode, the UE_A 10 may be registered with the network only in the N1 mode (that is, registered with only the 5GC), may be registered with the network only in the S1 mode (registered with only the EPC), or may be registered with the network both in the N1 mode and the S1 mode (registered with both of the 5GC and the EPC).

In order to perform interworking between the 5GS and the EPC, the UE supporting both of the 5GC and the EPC NAS can operate in the single registration mode or the dual registration mode.

The S1 mode is a mode in which the UE_A 10 is allowed to access the EPC via the E-UTRAN. In other words, the S1 mode may be a mode in which a message is transmitted and/or received using the S1 interface. Note that the S1 interface may include the S1-MME interface and the S1-U interface.

The N1 mode is a mode in which the UE_A 10 is allowed to access the 5GC via the 5G access network. In other words, the N1 mode may be a mode in which a message is transmitted and/or received using the N1 interface.

An Access Point Name (APN) may be identification information for identifying the core network and/or an external network such as the PDN. In addition, the APN can also be used as information for selecting a gateway such as the PGW_A 30/UPF_A 235 connecting the core network A_90.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using the PDU session.

Note that each apparatus (the UE, and/or the access network apparatus, and/or the core network apparatus) may associate one or more pieces of identification information with a PDU session for management. Note that these pieces of identification information may include one or more of a DNN, a QoS rule, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF_A 235 connecting the core network B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

A network slice (NS) is a logical network that provides specific network capability and network characteristics. The UE and/or the network can support the network slice (NW slice (NS)) in the 5GS.

A network slice instance (NSI) includes a set of an instance (entity) of a network function (NF) and necessary resources and forms a network slice to be mapped. Here, the NF is a processing function in a network, and is adopted or defined in 3GPP. The NSI is an entity of one or more NSs configured in the core network_B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. Each NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more S-NSSAIs in the registration information of the UE as default S-NSSAIs. Note that, in a case that the S-NSSAI is a default S-NSSAI, and the UE does not transmit to a network a valid S-NSSAI in a registration request message, the network may provide an NS related to the UE.

The Network Slice Selection Assistance Information (NSSAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

The Session and Service Continuity (SSC) mode indicates a mode of Session and Service Continuity supported by the system and/or each apparatus in the 5G system (5GS). More specifically, the SSC mode may be a mode indicating a type of session and service continuity supported by a PDU session that is established between the UE_A 10 and the UPF. Note that the SSC mode may be a mode indicating the type of session and service continuity configured for each PDU session. Furthermore, the SSC mode may include three modes of SSC mode 1, SSC mode 2, and SSC mode 3. Note that the SSC mode associated with the PDU session need not be changed while the PDU session is alive.

Radio Resource Control (RRC) connection is connection established between the UE and the base station apparatus in the access network. More specifically, the RRC connection is connection established in a Uu reference point between the UE and the base station apparatus in the access network. The RRC connection may include a radio bearer. In addition, the RRC connection may be connection established in 3GPP access. In addition, the RRC connection may be connection established in an RRC layer under a NAS layer. In addition, the RRC connection may be connection established and/or released in transmission and/or reception of an RRC message of the RRC layer. In addition, the RRC connection may be connection suspended in transmission and/or reception of an RRC message in the RRC layer.

5GMM-CONNECTED mode with RRC inactive indication is a state indicating that the state of the NAS layer is in a connected state even though the RRC layer is in an inactive state. In other words, 5GMM-CONNECTED mode with RRC inactive indication may be a state in which a radio bearer is released while NAS signaling connection and/or a context of the NAS signaling connection is maintained.

In addition, 5GMM-CONNECTED mode with RRC inactive indication may be a state in which the RRC connection is suspended. More specifically, 5GMM-CONNECTED mode with RRC inactive indication may be a state in which the RRC connection is suspended while the state of the NAS layer is in a connected state. In other words, 5GMM-CONNECTED mode with RRC inactive indication may be a state in which the RRC connection is suspended while the NAS signaling connection and/or the context of the NAS signaling connection is maintained.

Here, the UE may transition from 5GMM-CONNECTED mode to 5GMM-CONNECTED mode with RRC inactive indication, based on reception of information indicating that the RRC connection is suspended from a lower layer. In addition, the UE may transition, only for the state for 3GPP access, from 5GMM-CONNECTED mode to 5GMM-CONNECTED mode with RRC inactive indication, based on reception of information indicating that the RRC connection is suspended from a lower layer. Note that the information indicating that the RRC connection is suspended may be an indication indicating that the RRC connection is suspended.

Supporting 5GMM-CONNECTED mode with RRC inactive indication may mean that maintaining of a state of the NAS layer in the connected state is supported even in a case that a notification indicating that the RRC layer has become inactive is received from a lower layer. In addition, using 5GMM-CONNECTED mode with RRC inactive indication may mean that the state of the NAS layer is maintained in the connected state even in a case that a notification indicating that the RRC layer has become inactive is received from a lower layer.

PDU session with suspended user-plane resources is a PDU session in which user plane resources are established or re-established and a radio bearer is suspended. Here, timing at which the radio bearer is suspended may be timing at which the UE transitions to 5GMM-CONNECTED mode with RRC inactive indication. In addition, the radio bearer may be a data radio bearer.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA).

A TA list is a list including one or multiple TAs allocated to the UE_A 10 by the network. Note that while the UE_A 10 is moving within one or multiple TAs included in the TA list, the UE_A 10 may be able to move without performing a tracking area update procedure. In other words, for the UE_A 10, the TA list may be an information group indicating an area in which the UE_A 10 can move without performing the tracking area update procedure. Note that the TA list may be referred to as a TAI list including one or multiple Tracking area identities (TAIs), and the TAI list may hereinafter refer to a TA list.

A Local Area Data Network (LADN) refers to a DN to which the UE can connect only at a specific location, and provides connectivity with respect to a specific DNN (that is, an LADN DNN). The LADN may be a DN allowing connection by using a PDU session associated with a specific DNN at a specific location. In addition, the LADN may be a DN allowing connection by using a PDU session associated with a combination of a specific DNN and specific S-NSSAI at a specific location.

LADN information is information related to the LADN. The LADN information may be information indicating a specific LADN that can be used by the UE. The LADN information may include an LADN DNN and LADN service area information. More specifically, the LADN information may include one or multiple pieces of information (hereinafter referred to as information indicating the LADN) present for each LADN. In addition, the information indicating the LADN may include an LADN DNN and LADN service area information. Here, the LADN DNN may be information for identifying an LADN, may be information for identifying a DN regarded as an LADN, or may be a DNN used in a case that a PDU session is established with an LADN.

Note that, in a case that the LADN information is conventional LADN information, the LADN information may be information of the configuration described above. Specifically, in a case that the LADN information is the conventional LADN information, the LADN service area may be a conventional LADN service area.

Conversely, in a case that the LADN information is enhanced LADN information, the LADN information may be information in which a part of the configuration described above is enhanced. Specifically, in a case that the LADN information is the enhanced LADN information, the LADN service area may be an enhanced LADN service area. In addition, in a case that the LADN information is the enhanced LADN information, the information indicating the LADN may further include information indicating a time period for which the LADN service area is enabled and/or information indicating granularity of the LADN service area. In addition, in a case that the LADN information is the enhanced LADN information, the information indicating the LADN may further include the S-NSSAI.

The LADN service area is an area in which establishment of a PDU session for the LADN is possible. The LADN service area may be an area in which connection to the LADN is possible. In addition, the LADN service area may be an area indicated by the LADN service area information. Here, the LADN service area information may be information for identifying the LADN service area, may be provided as a set of tracking areas, or may be provided as a Tracking area identity (TAI) list.

Note that, in a case that the LADN service area is a conventional LADN service area, the LADN service area may be an area including a tracking area belonging to a registration area to which the UE is currently connected. In other words, in a case that the LADN service area is the conventional LADN service area, the LADN service area may be an area including one or multiple tracking areas. Conversely, in a case that the LADN service area is an enhanced LADN service area, the LADN service area may be an area including the tracking area, or may be an area covered by a part of the base stations in the tracking area. In addition, in a case that the LADN service area is the enhanced LADN service area, the LADN service area may be an area of a size other than the area including the tracking area, or may be an area independent of the tracking area. In other words, in a case that the LADN service area is the enhanced LADN service area, the LADN service area may be an area including one or multiple tracking areas, or may be an area different from the area including one or multiple tracking areas.

In addition, in a case that the LADN service area is the area including one or multiple tracking areas, the LADN service area information may be a tracking area ID list including one or multiple tracking area IDs. Conversely, in a case that the LADN service area is an area different from the area including one or multiple tracking areas, the LADN service area information may be information that assistance of the Radio Access Network (RAN) is necessary, or may be information that the assistance of the RAN is not necessary. Here, the information that the assistance of the RAN is necessary may be information of a cell, or may be information of a base station. In addition, the information that the assistance of the RAN is necessary may be a cell ID, or may be a base station ID. In addition, the information that the assistance of the RAN is necessary is not limited to these, and may be information defined by the RAN. In addition, the information that the assistance of the RAN is not necessary may be physical location information, or may be location information that can be acquired by an application. In addition, the information that the assistance of the RAN is not necessary is not limited to these, and may be information that can be acquired by other than the RAN. Here, the RAN may be referred to as the access network. Conversely, the access network may be referred to as the RAN.

Enhancement of the LADN service area may mean use of an LADN service area having granularity different from that of the conventional LADN service area. In addition, enhancement of the LADN service area may mean use of enhanced LADN information different from the conventional LADN information. In addition, enhancement of the LADN service area may mean connection to an enhanced LADN different from the conventional LADN.

In other words, in a case that each apparatus supports enhancement of the LADN service area, in addition to the conventional LADN service area, application of an enhanced LADN service area different from the conventional LADN service area may also be possible. In addition, in a case that each apparatus supports enhancement of the LADN service area, in addition to the conventional LADN information, use of the enhanced LADN information different from the conventional LADN information may also be possible. In addition, in a case that each apparatus supports enhancement of the LADN service area, in addition to the conventional LADN, connection to the enhanced LADN different from the conventional LADN may be possible.

Conversely, in a case that a part in each apparatus does not support enhancement of the LADN service area, application of only the conventional LADN service area may be possible, with application of the enhanced LADN service area being not possible. In addition, in a case that a part in each apparatus does not support enhancement of the LADN service area, use of only the conventional LADN information may be possible, with use of the enhanced LADN information being not possible. In addition, in a case that a part in each apparatus does not support enhancement of the LADN service area, connection to only the conventional LADN may be possible, with connection to the enhanced LADN being not possible.

In a case that each apparatus supports restriction on use of enhancement of the LADN service area, application of only the conventional LADN service area may be possible, with application of the enhanced LADN service area being not possible. In addition, in a case that each apparatus supports restriction on use of enhancement of the LADN service area, use of only the conventional LADN information may be possible, with use of the enhanced LADN information being not possible. In addition, in a case that each apparatus supports restriction on use of enhancement of the LADN service area, connection to only the conventional LADN may be possible, with connection to the enhanced LADN being not possible.

Conversely, in a case that each apparatus does not support restriction on use of enhancement of the LADN service area, application of the enhanced LADN service area may also be possible. In addition, in a case that each apparatus does not support restriction on use of enhancement of the LADN service area, use of the enhanced LADN information may also be possible. In addition, in a case that each apparatus does not support restriction on use of enhancement of the LADN service area, connection to the enhanced LADN may be possible.

A PDU session for the LADN (PDU session for LADN) is a PDU session associated with a DNN associated with the LADN. The PDU session for the LADN may be a PDU session established with the LADN. In other words, the PDU session for the LADN may be a PDU session established between the UE and the LADN, or may be a PDU session used for user data communication between the UE and the LADN. Note that the PDU session for the LADN may be a PDU session that can be established only in the LADN service area. In other words, the UE may use a specific DNN at a specific location, and thereby be able to establish a PDU session for the LADN. In still other words, the UE may use a combination of a specific DNN and specific S-NSSAI at a specific location, and thereby be able to establish a PDU session for the LADN.

A Non-Public Network (NPN) is a non-public network used by a specific user for a specific purpose, such as by a company or for private utilization, instead of a purpose of general utilization. The NPN has two types, namely a Stand-alone Non-Public Network (SNPN) and a Public network integrated NPN. Note that the expression "NPN" below may mean both the SNPN and the Public network integrated NPN.

The SNPN is a network that is operated by an NPN operator and is not affected by function units provided by the PLMN. In other words, the SNPN is an NPN-dedicated network that is independent from the PLMN opened to public. The SNPN may be a network identified with an SNPN identity (SNPN ID). Note that the SNPN ID may be information obtained by combining a PLMN ID and a Network identifier (NID). Note that the PLMN ID used for the SNPN ID may be information secured for a private network, and an MCC included in the PLMN ID may be 999, for example. In addition, in a case that the UE is registered with the SNPN, the SNPN being registered may be referred to as a registered SNPN or RSNPN.

The Network identifier (NID) is information for identifying the network. The SNPN may be identified with information obtained by combining a PLMN ID and an NID. The NID may be information that is unique in the SNPN or may be information that is unique worldwide.

The Public network integrated NPN is a network implemented using function units of the PLMN. In other words, the Public network integrated NPN is an NPN that is virtually implemented in the PLMN. Moreover, the Public network integrated NPN is an NPN that can be created via the PLMN. Note that the Public network integrated NPN may be implemented using a function of a network slice. Specifically, the Public network integrated NPN may be a network that can be implemented using a network slice allocated for the NPN. In this case, the Public network integrated NPN may be identified with the S-NSSAI or may be identified with a combination of the S-NSSAI and a CAG ID.

In addition, the Public network integrated NPN may be implemented using the DN. Specifically, the Public network integrated NPN may be a network that can be implemented using a DN for the NPN. In this case, the Public network integrated NPN may be identified with the DNN or may be identified with a combination of the DNN and the CAG ID.

The Closed Access Groups (CAG) ID is information for identifying a group of subscribers who are allowed to connect to one or multiple cells associated with the CAG. The CAG may be a group identified by the CAG ID. The CAG is a group used in a case that the Public network integrated NPN is implemented using a network slice. The CAG may be used so that a UE not allowed to use the NPN does not attempt access to a network slice allocated for the NPN. In addition, the CAG ID is information that is unique in the PLMN.

An SNPN enable UE is a UE configured to use the SNPN. The SNPN enable UE may store at least one piece of information related to the SNPN. In other words, configuration information of the SNPN enable UE may include information indicating that use of the SNPN is possible. In addition, the SNPN enable UE may support an SNPN access mode. In other words, the SNPN enable UE may operate in the SNPN access mode.

The SNPN access mode is a mode in which the SNPN is selected. The SNPN access mode may be a mode in which the UE is registered with the SNPN. In addition, the SNPN access mode may be a mode in which the UE is connected to the SNPN. In other words, the UE operating in the SNPN access mode may select only the SNPN in network selection. More specifically, the UE operating in the SNPN access mode may select only the SNPN via the Uu interface in network selection. In other words, the UE operating in the SNPN access mode may select the SNPN without selecting the PLMN in network selection. Here, the UE operating in the SNPN access mode may be expressed as the UE in the SNPN access mode. In addition, the UE in the SNPN access mode may be the SNPN enable UE.

An equivalent SNPN (equivalent PLMN) may be an SNPN regarded as an SNPN the same as any SNPN. For example, the equivalent SNPN may be one or multiple SNPNs regarded as being the same as the registered SNPN.

In addition, the equivalent SNPN may be a PLMN regarded as an SNPN the same as any SNPN. For example, the equivalent SNPN may be one or multiple PLMNs regarded as being the same as the registered SNPN.

In addition, the equivalent SNPN may be one or multiple SNPNs identified with a PLMN ID the same as any SNPN, or may be a PLMN. For example, the equivalent SNPN may be one or multiple SNPNs identified with a PLMN ID the same as the registered SNPN, or may be a PLMN. In addition, the equivalent SNPN may be a PLMN identified with a PLMN ID the same as the registered SNPN, and an equivalent PLMN of the PLMN.

Default UE credentials are information stored in the UE before an actual onboarding procedure. The default UE credentials may be information used to uniquely identify the UE. In addition, the default UE credentials may be information used to prove security of the UE.

A Default Credential Server (DCS) is a server that can authenticate the UE, using the default UE credentials. The default credential server may be a server that can provide another apparatus or entity with a function of authenticating the UE using the default UE credentials.

NPN credentials are information used by the UE for authentication in order to access the NPN. The NPN credentials may be 3GPP credentials, or may be non-3GPP credentials.

An Onboarding Network (ON) is a network that provides initial registration and/or access for the UE for the sake of onboarding. In other words, the UE may be registered with and/or access the onboarding network and perform onboarding.

Here, the onboarding network may be implemented by the PLMN. In addition, the onboarding network may be implemented by the SNPN.

A Provisioning Server is a server that provides subscription data for the UE authenticated and/or authorized. The Provisioning Server may be a server that provides the subscription data and other configuration information for the UE authenticated and/or authorized.

In addition, the provisioning server may be a server present in the onboarding network. In addition, the provisioning server may be a server present in the PLMN. In addition, the provisioning server may be a server present in the SNPN. In addition, the provisioning server may be a server present in the core network. In addition, the provisioning server may be a server present in an external DN.

A Subscription Owner (SO) is an entity that stores subscription data and/or other configuration information, and provides, as a result of a UE onboarding procedure, the subscription data and/or other configuration information for the UE via a PS domain. In other words, the subscription owner may be an entity that stores subscription data and/or other configuration information, and that provides the subscription data and/or other configuration information for the UE in the UE onboarding procedure.

UE onboarding refers to providing the UE and/or an entity in the network with information necessary for the UE to obtain access and/or connectivity to an authorized NPN.

In other words, UE onboarding may refer to provision of information for the UE and an entity in the network. Here, the information may be information necessary for the UE to establish access and/or connectivity to the NPN. In addition, the access and/or the connectivity to the NPN may be ones authorized. In addition, the information may be SNPN information.

In still other words, in a case that the UE attempts to establish access and/or connectivity to the NPN, the UE may perform UE onboarding and thereby acquire the information necessary for establishing access and/or connectivity to the NPN. In addition, after performing UE onboarding, the UE may perform a procedure for establishing access and/or connectivity to the NPN.

Note that UE onboarding may be referred to as a UE onboarding procedure. In addition, UE onboarding may be referred to as an onboarding service. In addition, UE onboarding may be referred to as onboarding.

In other words, the expression "UE onboarding procedure" may mean UE onboarding. In addition, the expression "onboarding service" may mean UE onboarding. In addition, the expression "onboarding" may mean UE onboarding.

The SNPN information is information necessary for the UE to establish access and/or connectivity to the SNPN. The SNPN information may be information used by the UE in a case that the UE performs the procedure for establishing access and/or connectivity to the SNPN. In addition, the SNPN information may be the subscription data and/or other configuration information. In addition, the SNPN information may be the NPN credentials. In addition, the SNPN information may be referred to as NPN information.

Note that the UE may acquire the SNPN information from the network in UE onboarding. More specifically, the UE may acquire the SNPN information from the provisioning server or the subscription owner in UE onboarding.

In other words, the network may provide the SNPN information for the UE in UE onboarding. More specifically, the provisioning server or the subscription owner may provide the SNPN information for the UE in UE onboarding.

An SNPN information provision procedure is a procedure for the network to provide the SNPN information for the UE. In other words, the SNPN information provision procedure is a procedure for the UE to acquire the SNPN information from the network. In addition, the SNPN information provision procedure may be a procedure for performing UE onboarding.

The network may provide the SNPN information for the UE in the SNPN information provision procedure. More specifically, the provisioning server or the subscription owner may provide the SNPN information for the UE in the SNPN information provision procedure.

In addition, the UE may acquire the SNPN information from the network in the SNPN information provision procedure. More specifically, the UE may acquire the SNPN information from the provisioning server or the subscription owner in the SNPN information provision procedure.

In addition, the UE may release a first list, based on completion of the SNPN information provision procedure. In other words, the UE may release the first list, based on completion of acquisition of the SNPN information.

More specifically, in a case that the UE stores the first list, the UE may release the first list, based on completion of the SNPN information provision procedure. In other words, in a case that the UE stores the first list, the UE may release the first list, based on completion of acquisition of the SNPN information.

Conversely, the UE may release the first list in a de-registration procedure performed after completion of the SNPN information provision procedure. More specifically, in a case that the UE stores the first list, the UE may release the first list in the de-registration procedure performed after completion of the SNPN information provision procedure.

Here, the SNPN information provision procedure may include an SNPN information provision procedure via the user plane and an SNPN information provision procedure via the control plane.

The SNPN information provision procedure via the user plane is a procedure in which the network provides the SNPN information for the UE via the user plane. In other words, the SNPN information provision procedure via the user plane is a procedure in which the UE acquires the SNPN information from the network via the user plane.

Specifically, the SNPN information provision procedure via the user plane is a procedure in which a PDU session is established between the UE and the network, and then the SNPN information is provided from the network to the UE by using the PDU session.

Here, in a case that the SNPN information provision procedure via the user plane is used, the network may establish a PDU session with the UE and transmit the SNPN information to the UE on the PDU session, and thereby provide the SNPN information for the UE. In other words, in a case that the SNPN information provision procedure via the user plane is used, the UE may establish a PDU session with the network and receive the SNPN information from the network on the PDU session, and thereby acquire the SNPN information for the UE.

Note that the PDU session used for providing the SNPN information may be a PDU session used for providing the SNPN information. In other words, the PDU session used for providing the SNPN information may be a PDU session for SNPN information provision.

The SNPN information provision procedure via the control plane is a procedure in which the network provides the SNPN information for the UE via the control plane. In other words, the SNPN information provision procedure via the control plane is a procedure in which the UE acquires the SNPN information from the network via the control plane.

Specifically, the SNPN information provision procedure via the control plane is a procedure in which the SNPN information is provided from the network to the UE by using a control message transmitted and/or received on the control plane.

Here, in a case that the SNPN information provision procedure via the control plane is used, the SNPN information may be included in a UE Route Selection Policy (URSP) and transmitted to the UE, to thereby provide the SNPN information for the UE. In addition, in a case that the SNPN information provision procedure via the control plane is used, the SNPN information may be included in Protocol Configuration Options (PCO) or Extended Protocol Configuration Options (ePCO) and transmitted to the UE, to thereby provide the SNPN information for the UE.

In other words, in a case that the SNPN information provision procedure via the control plane is used, the UE may receive the SNPN information included in the URSP from the network and thereby acquire the SNPN information for the UE. In a case that the SNPN information provision procedure via the control plane is used, the UE may receive the SNPN information included in the PCO or the ePCO from the network, and thereby acquire the SNPN information for the UE.

Note that the URSP may be an information element included in a UE policy management command message (MANAGE UE POLICY COMMAND message). In addition, the PCO may be an information element included in a Session Management message (SM message). In addition, the ePCO may be an information element included in a Session Management message (SM message).

In addition, the UE policy management command message may be a control message transmitted and/or received between the PCF and the UE. In addition, the SM message may be a control message transmitted and/or received between the UE and the SMF. In addition, the SM message may include a PDU session establishment reception message (PDU SESSION ESTABLISHMENT ACCEPT message), a PDU session modification command message (PDU SESSION MODIFICATION COMMAND message), a PDU session release command message (PDU SESSION RELEASE COMMAND message), and the like.

The first list is a list including information for identifying one or multiple networks in which the onboarding service is unavailable. The first list may be a list including information for identifying the one or multiple networks. In other words, the first list may be a set including information for identifying the one or multiple networks.

Here, the network identified with the information for identifying the network may be a network in which the onboarding service is unavailable. In addition, the network identified with the information for identifying the network may be a network not supporting the onboarding service. In addition, the network identified with the information for identifying the network may be the Public Land Mobile Network (PLMN), or may be the Stand-alone Non-Public Network (SNPN).

In addition, the information for identifying the network may be information for identifying the PLMN, or may be information for identifying the SNPN. In other words, the information for identifying the network may be the PLMN ID and/or the SNPN ID. In addition, the information for identifying the network may be the PLMN identity and/or the SNPN identity.

In addition, the first list may be managed until the time the SNPN information is provided for the UE. In other words, the first list may be released based on provision of the SNPN information for the UE. In addition, the first list may be released based on performing of the de-registration procedure procedure.

In addition, the first list may be released based on power off and/or removal of a SIM. In addition, the first list may be released based on expiration of a timer.

In addition, the first list may be managed for each access. Specifically, the first list may be managed separately for a list for 3GPP access and a list for non-3GPP access.

1st identification information is information indicating only the onboarding service. In addition, the 1st identification information may be information indicating a request for only the onboarding service. In addition, the 1st identification information may be information indicating a request for registration in which only the onboarding service is available. Note that the 1st identification information may be implemented with a request type in which the onboarding service is configured.

In addition, the 1st identification information may be information indicating whether the UE supports registration in which only the onboarding service is available. The 1st identification information may be information indicating that the UE supports registration in which only the onboarding service is available, or may be information indicating that the UE does not support registration in which only the onboarding service is available. In addition, the 1st identification information may be implemented with a bit indicating whether the UE supports registration in which only the onboarding service is available. Here, the bit indicating whether the UE supports registration in which only the onboarding service is available may be a bit constituting a 5GMM capability information element indicating a capability of the UE in 5G.

In addition, the 1st identification information may be the default UE credentials. In addition, the 1st identification information may be information for identifying the UE. In addition, the 1st identification information may be information for identifying the default credential server. In addition, the 1st identification information may be information for identifying the network to be connected to.

In addition, the 1st identification information may be information selected and determined based on a configuration of the UE, and/or a state of the UE, and/or a user policy, and/or a request of an application.

2nd identification information is information indicating a type of SNPN information provision procedure supported by the UE. The 2nd identification information may be information indicating that the UE supports acquisition of the SNPN information via the user plane (UP), or may be information indicating that the UE supports acquisition of the SNPN information via the control plane (CP). In addition, the 2nd identification information may be implemented with a bit indicating a type of SNPN information provision procedure supported by the UE. Here, the bit indicating the type of SNPN information provision procedure supported by the UE may be a bit constituting a 5GMM capability information element indicating a capability of the UE in 5G.

In addition, the 2nd identification information may be information including meaning indicated by 3rd identification information and meaning indicated by 4th identification information. In addition, the 2nd identification information may be information including the 3rd identification information and the 4th identification information.

In addition, the 2nd identification information may be information selected and determined based on a configuration of the UE, and/or a state of the UE, and/or a user policy, and/or a request of an application.

The 3rd identification information is information indicating whether the UE supports acquisition of the SNPN information via the user plane (UP). The 3rd identification information may be information indicating that the UE supports acquisition of the SNPN information via the user plane, or may be information indicating that the UE does not support acquisition of the SNPN information via the user plane. In addition, the 3rd identification information may be implemented with a bit indicating whether the UE supports acquisition of the SNPN information via the user plane. Here, the bit indicating whether the UE supports acquisition of the SNPN information via the user plane may be a bit constituting a 5GMM capability information element indicating a capability of the UE in 5G.

In addition, the 3rd identification information may be information selected and determined based on a configuration of the UE, and/or a state of the UE, and/or a user policy, and/or a request of an application.

The 4th identification information is information indicating whether the UE supports acquisition of the SNPN information via the control plane (CP). The 4th identification information may be information indicating that the UE supports acquisition of the SNPN information via the control plane, or may be information indicating that the UE does not support acquisition of the SNPN information via the control plane. In addition, the 4th identification information may be implemented with a bit indicating whether the UE supports acquisition of the SNPN information via the control plane. Here, the bit indicating whether the UE supports acquisition of the SNPN information via the control plane may be a bit constituting a 5GMM capability information element indicating a capability of the UE in 5G.

In addition, the 4th identification information may be information selected and determined based on a configuration of the UE, and/or a state of the UE, and/or a user policy, and/or a request of an application.

5th identification information is information indicating a type of SNPN information provision procedure requested by the UE. The 5th identification information may be information indicating that the UE requests acquisition of the SNPN information via the user plane (UP), or may be information indicating that the UE requests acquisition of the SNPN information via the control plane (CP). In addition, the 5th identification information may be implemented with a bit indicating a type of SNPN information provision procedure requested by the UE. Here, the bit indicating the type of SNPN information provision procedure requested by the UE may be a bit constituting a 5GS update type information element.

In addition, the 5th identification information may be information selected and determined based on a configuration of the UE, and/or a state of the UE, and/or a user policy, and/or a request of an application.

11th identification information is information indicating whether the network supports registration in which only the onboarding service is available. The 11th identification information may be information indicating that the network supports registration in which only the onboarding service is available, or may be information indicating that the network does not support registration in which only the onboarding service is available. In addition, the 11th identification information may be implemented with a bit indicating whether the network supports registration in which only the onboarding service is available. Here, the bit indicating whether the network supports registration in which only the onboarding service is available may be a bit constituting a 5GS network function support information element (5GS network feature support information element) indicating a capability of the network in 5G.

In addition, the 11th identification information may be information indicating whether registration in which only the onboarding service is available is allowed. The 11th identification information may be information indicating that registration in which only the onboarding service is available is allowed, or may be information indicating that registration in which only the onboarding service is available is not allowed. In addition, the 11th identification information may be implemented with a bit indicating whether registration in which only the onboarding service is available is allowed.

In addition, the 11th identification information may be information selected and determined by the network, based on received identification information, and/or information associated with the NSI, and/or capability information of the network, and/or an operator policy, and/or a state of the network, and/or registration information of a user, and/or the like.

12th identification information is information indicating a type of SNPN information provision procedure supported by the network. The 12th identification information may be information indicating that the network supports provision of the SNPN information via the user plane (UP), or may be information indicating that the network supports provision of the SNPN information via the control plane (CP). In addition, the 12th identification information may be implemented with a bit indicating a type of SNPN information provision procedure supported by the network. Here, the bit indicating the type of SNPN information provision procedure supported by the network may be a bit constituting a 5GS network function support information element (5GS network feature support information element) indicating a capability of the network in 5G.

In addition, the 12th identification information may be information indicating that the SNPN information is provided via the user plane. In addition, the 12th identification information may be information indicating that provision of the SNPN information via the user plane is supported.

In addition, the 12th identification information may be information indicating that the SNPN information is provided via the control plane. In addition, the 12th identification information may be information indicating that provision of the SNPN information via the control plane is supported.

In addition, the 12th identification information may be information including meaning indicated by 13th identification information and meaning indicated by 14th identification information. In addition, the 12th identification information may be information including the 13th identification information and the 14th identification information.

In addition, the 12th identification information may be information selected and determined by the network, based on one or more pieces of identification information out of the 2nd identification information to the 5th identification information received, and/or information associated with the NSI, and/or capability information of the network, and/or an operator policy, and/or a state of the network, and/or registration information of a user, and/or the like.

The 13th identification information is information indicating whether the network supports provision of the SNPN information via the user plane (UP). The 13th identification information may be information indicating that the network supports provision of the SNPN information via the user plane, or may be information indicating that the network does not support provision of the SNPN information via the user plane. In addition, the 13th identification information may be implemented with a bit indicating whether the network supports provision of the SNPN information via the user plane. Here, the bit indicating whether the network supports provision of the SNPN information via the user plane may be a bit constituting a 5GS network function support information element (5GS network feature support information element) indicating a capability of the network in 5G.

In addition, the 13th identification information may be information indicating that the SNPN information is provided via the user plane. In addition, the 13th identification information may be information indicating that provision of the SNPN information via the user plane is supported.

In addition, the 13th identification information may be information selected and determined by the network, based on one or more pieces of identification information out of the 2nd identification information to the 5th identification information received, and/or information associated with the NSI, and/or capability information of the network, and/or an operator policy, and/or a state of the network, and/or registration information of a user, and/or the like.

The 14th identification information is information indicating whether the network supports provision of the SNPN information via the control plane (CP). The 14th identification information may be information indicating that the network supports provision of the SNPN information via the control plane, or may be information indicating that the network does not support provision of the SNPN information via the control plane. In addition, the 14th identification information may be implemented with a bit indicating whether the network supports provision of the SNPN information via the control plane. Here, the bit indicating whether the network supports provision of the SNPN information via the control plane may be a bit constituting a 5GS network function support information element (5GS network feature support information element) indicating a capability of the network in 5G.

In addition, the 14th identification information may be information indicating that the SNPN information is provided via the control plane. In addition, the 14th identification information may be information indicating that provision of the SNPN information via the control plane is supported.

In addition, the 14th identification information may be information selected and determined by the network, based on one or more pieces of identification information out of the 2nd identification information to the 5th identification information received, and/or information associated with the NSI, and/or capability information of the network, and/or an operator policy, and/or a state of the network, and/or registration information of a user, and/or the like.

21st identification information is a cause value indicating the reason why the registration procedure is rejected. The 21st identification information may be a 5GS Session Management (5GSM) cause value.

Here, the cause value may indicate that the onboarding service is unavailable. In other words, the cause value may indicate that the onboarding service is not allowed. In addition, the cause value may indicate that registration in which only the onboarding service is available is not allowed.

In addition, the cause value may indicate that the network does not support the onboarding service. The cause value may indicate that the network does not support registration in which only the onboarding service is available.

In addition, the cause value may indicate that the request for only the onboarding service is rejected. In addition, the cause value may indicate that the request for registration in which only the onboarding service is available is rejected.

In addition, the 21st identification information may be information indicating that the onboarding service is unavailable. In other words, the 21st identification information may be information indicating that the onboarding service is not allowed. In addition, the 21st identification information may be information indicating that registration in which only the onboarding service is available is not allowed.

In addition, the 21st identification information may be information indicating that the network does not support the onboarding service. The 21st identification information may be information indicating that the network does not support registration in which only the onboarding service is available.

In addition, the 21st identification information may be information indicating that the request for only the onboarding service is rejected. In addition, the 21st identification information may be information indicating that the request for registration in which only the onboarding service is available is rejected.

In addition, the 21st identification information may be information selected and determined by the network, based on received identification information, and/or information associated with the NSI, and/or capability information of the network, and/or an operator policy, and/or a state of the network, and/or registration information of a user, and/or the like.

31st identification information is a cause value indicating the reason why the de-registration procedure is initiated. The 31st identification information may be a 5GS Session Management (5GSM) cause value.

Specifically, the 31st identification information may be information indicating that provision of the SNPN information and/or acquisition of the SNPN information has succeeded. Conversely, the 31st identification information may be information indicating that provision of the SNPN information and/or acquisition of the SNPN information has failed.

In addition, the 31st identification information may be information indicating that provision of the SNPN information and/or acquisition of the SNPN information has been completed. More specifically, the 31st identification information may be information indicating that provision of the SNPN information and/or acquisition of the SNPN information has been completed successfully. In other words, the 31st identification information may be information indicating that the UE has already acquired the SNPN information, or may be information indicating that the network has already provided the SNPN information.

Conversely, the 31st identification information may be information indicating that provision of the SNPN information and/or acquisition of the SNPN information has failed. More specifically, the 31st identification information may be information indicating that provision of the SNPN information and/or acquisition of the SNPN information has not been completed successfully. In other words, the 31st identification information may be information indicating that the UE has failed to acquire the SNPN information, or may be information indicating that the network has failed to provide the SNPN information.

In addition, the 31st identification information may be information indicating that the onboarding service has been completed. More specifically, the 31st identification information may be information indicating that the onboarding service has been completed successfully. Conversely, the 31st identification information may be information indicating that the onboarding service has not been completed successfully.

In addition, the 31st identification information may be information indicating that the onboarding service is unavailable. In other words, the 31st identification information may be information indicating that the onboarding service is not allowed. In addition, the 31st identification information may be information indicating that registration in which only the onboarding service is available is not allowed.

In addition, the 31st identification information may be information selected and determined by the network, based on received identification information, and/or information associated with the NSI, and/or capability information of the network, and/or an operator policy, and/or a state of the network, and/or registration information of a user, and/or the like.

3.2. Description of Procedures Used in Each Embodiment

Next, procedures used in each embodiment will be described. Note that the procedures used in each embodiment include a Registration procedure, a PDU session establishment procedure, and a UE configuration update procedure (Generic UE configuration update procedure). Each procedure will be described below.

Note that, in each embodiment, a case that each of the combinations including the HSS and the UDM, the PCF and the PCRF, the SMF and the PGW-C, and the UPF and the PGW-U is configured to form a single apparatus (that is, the same physical hardware, or the same logical hardware, or the same software) as illustrated in FIG. 2 will be described as an example. However, the details described in the present embodiment can also be applied to a case that each of the combinations is configured to form different apparatuses (that is, different pieces of physical hardware, or different pieces of logical hardware, or different pieces of software). For example, between the apparatuses/functions, data may be directly transmitted and/or received, data may be transmitted and/or received via an N26 interface between the AMF and the MME, or data may be transmitted and/or received via the UE.

3.2.1. Registration Procedure

First, the Registration procedure will be described with reference to FIG. 7. The registration procedure is a procedure in the 5GS. Hereinafter, the present procedure will refer to the registration procedure. The registration procedure is a procedure for registration with the access network_B, and/or the core network_B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (RM-DEREGISTERED state). Each apparatus (in particular, the UE and the AMF) can transition to the registered state (RM-REGISTERED state), based on completion of the registration procedure.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the present procedure in a case that a running timer has expired. In addition, the UE may initiate the registration procedure in a case that a context of each apparatus needs to be updated due to disconnection and/or deactivation of a PDU session. In addition, in a case that there is a change in capability information and/or a preference, related to PDU session establishment, of the UE, the UE may initiate the registration procedure. In addition, the UE may periodically initiate the registration procedure. In addition, the UE may initiate the registration procedure, based on completion of a UE configuration update procedure. Note that these are not restrictive, and the UE can perform the registration procedure at any timing.

In addition, the UE may initiate the registration procedure periodically, even in a case that the UE is in the registered state. In other words, the UE may initiate the registration procedure, based on expiration of the timer.

Note that the registration procedure performed based on mobility of the UE and the registration procedure performed periodically may be referred to as a registration procedure for mobility and registration update. In other words, the registration procedure for mobility and registration update may be the registration procedure performed based on mobility of the UE, or may be the registration procedure performed periodically. In addition, the registration procedure for mobility and registration update may be a registration procedure performed based on configuration update of the UE. In addition, the registration procedure for mobility and registration update may be a registration procedure performed for establishing a communication path for transmitting and/or receiving user data. In addition, the registration procedure for mobility and registration update may be a registration procedure performed based on a request from the network. In still other words, the registration procedure for mobility and registration update may be a registration procedure other than an initial registration procedure. The registration procedure for mobility and registration update may be hereinafter referred to as the present procedure.

Next, each step of the registration procedure will be described. Note that the registration procedure to be described below may be the initial registration procedure, or may be the registration procedure for mobility and registration update.

First, the UE transmits a Registration request message to the AMF (S800) (S802) (S804), and thereby initiates the registration procedure. Specifically, the UE transmits an RRC message including the registration request message to the 5G AN (or the gNB) (S800). Note that the registration request message is a NAS message. The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

Here, the UE may include at least one or more pieces of identification information out of the 1st identification information to the 5th identification information in the registration request message and/or the RRC message for transmission. More specifically, the UE can include at least one or more pieces of identification information out of the 1st identification information to the 5th identification information in the registration request message and/or the RRC message and transmit the registration request message and/or the RRC message; however, the UE may include the one or more pieces of identification information in a control message different from the above, for example, a control message of a layer (e.g., the MAC layer, the RLC layer, or the PDCP layer) lower than the RRC layer and transmit the control message. Note that, by transmitting these pieces of identification information, the UE may indicate that the UE supports each function, or may indicate a request of the UE. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the UE requests the onboarding service, the UE may include one or more pieces of identification information out of identification information of the 1st identification information to the 5th identification information in the registration request message. In addition, in a case that the UE requests registration in which only the onboarding service is available, the UE may include one or more pieces of identification information out of identification information of the 1st identification information to the 5th identification information in the registration request message. In addition, in a case that the UE requests use of the SNPN information provision procedure, the UE may include one or more pieces of identification information out of identification information of the 1st identification information to the 5th identification information in the registration request message.

In addition, in a case that the UE supports the onboarding service, the UE may include one or more pieces of identification information out of identification information of the 1st identification information to the 5th identification information in the registration request message. In addition, in a case that the UE supports the SNPN information provision procedure, the UE may include one or more pieces of identification information out of identification information of the 1st identification information to the 5th identification information in the registration request message.

In addition, in a case that the UE needs to acquire the SNPN information, the UE may include one or more pieces of identification information out of identification information of the 1st identification information to the 5th identification information in the registration request message. In addition, in a case that the UE needs to perform the onboarding service, the UE may include one or more pieces of identification information out of identification information of the 1st identification information to the 5th identification information in the registration request message. In addition, in a case that the UE needs to perform the SNPN information provision procedure, the UE may include one or more pieces of identification information out of identification information of the 1st identification information to the 5th identification information in the registration request message.

In addition, in a case that the UE supports registration in which only the onboarding service is available, the UE may include the 1st identification information in the registration request message. More specifically, in a case that the UE supports the onboarding service, the UE may include the 1st identification information indicating that the UE supports registration in which only the onboarding service is available in the registration request message.

In addition, in a case that the UE supports the SNPN information provision procedure, the UE may include the 2nd identification information indicating a type of SNPN information provision procedure supported by the UE in the registration request message. More specifically, in a case that the UE supports the SNPN information provision procedure via the user plane, the UE may include the 2nd identification information indicating support of the SNPN information provision procedure via the user plane in the registration request message. In addition, in a case that the UE supports the SNPN information provision procedure via the control plane, the UE may include the 2nd identification information indicating support of the SNPN information provision procedure via the control plane in the registration request message.

In addition, in a case that the UE supports the SNPN information provision procedure via the user plane, the UE may include the 3rd identification information in the registration request message. More specifically, in a case that the UE supports the SNPN information provision procedure via the user plane, the UE may include the 3rd identification information indicating support of the SNPN information provision procedure via the user plane in the registration request message.

In addition, in a case that the UE supports the SNPN information provision procedure via the control plane, the UE may include the 4th identification information in the registration request message. More specifically, in a case that the UE supports the SNPN information provision procedure via the control plane, the UE may include the 4th identification information indicating support of the SNPN information provision procedure via the control plane in the registration request message.

In addition, in a case that the UE supports the SNPN information provision procedure via the control plane, the UE may include the 4th identification information indicating support of the SNPN information provision procedure using the PCO or the ePCO in the registration request message. In addition, in a case that the UE supports the SNPN information provision procedure via the control plane, the UE may include the 4th identification information indicating support of the SNPN information provision procedure using the URSP in the registration request message.

In addition, in a case that the UE requests use of the SNPN information provision procedure, the UE may include the 5th identification information in the registration request message. In addition, in a case that the UE requests use of the SNPN information provision procedure, the UE may include the 5th identification information indicating a type of SNPN information provision procedure requested by the UE in the registration request message. More specifically, in a case that the UE requests use of the SNPN information provision procedure via the user plane, the UE may include the 5th identification information indicating the SNPN information provision procedure via the user plane in the registration request message. In addition, in a case that the UE requests use of the SNPN information provision procedure via the control plane, the UE may include the 5th identification information indicating the SNPN information provision procedure via the control plane in the registration request message.

In addition, by including one or more pieces of identification information out of identification information of the 1st identification information to the 5th identification information in the registration request message, the UE may indicate, to the network, details indicated by the piece(s) of identification information included in the registration request message. In addition, by including one or more pieces of identification information out of identification information of the 1st identification information to the 5th identification information in the registration request message, the UE may request details indicated by the piece(s) of identification information included in the registration request message from the network.

The UE may include an SM message (for example, the PDU session establishment request message) in the registration request message and transmit the registration request message, or may transmit an SM message (for example, the PDU session establishment request message) together with the registration request message to thereby initiate the PDU session establishment procedure during the registration procedure.

After the 5G AN (or the gNB) receives the RRC message including the registration request message, the 5G AN (or the gNB) selects the AMF to which the registration request message is to be transferred (S802). Note that the 5G AN (or the gNB) can select the AMF, based on information included in the registration request message and/or the RRC message. The 5G AN (or the gNB) extracts the registration request message from the received RRC message, and transfers the registration request message to the selected AMF (S804).

In a case that the AMF receives the registration request message, the AMF can perform first condition fulfillment determination. The first condition fulfillment determination is a condition fulfillment determination for determining whether the network (or the AMF) accepts the request from the UE. In a case that the first condition fulfillment determination is true, the AMF initiates a procedure of (A) of FIG. 7, whereas in a case that the first condition fulfillment determination is false, the AMF initiates a procedure of (B) of FIG. 7.

Note that the first condition fulfillment determination may be performed based on reception of the registration request message, and/or each piece of identification information included in the registration request message, and/or subscriber information, and/or capability information of the network, and/or an operator policy, and/or a state of the network, and/or registration information of a user, and/or a context stored in the AMF, and/or the like. For example, the first condition fulfillment determination may be true in a case that the network allows the request from the UE, and the first condition fulfillment determination may be false in a case that the network does not allow the request from the UE. In a case that a network with which the UE is to be registered and/or an apparatus in the network supports the function requested by the UE, the first condition fulfillment determination may be true, whereas in a case that the network and/or the apparatus does not support the function requested by the UE, the first condition fulfillment determination may be false. In addition, in a case that the transmitted and/or received identification information is allowed, the first condition fulfillment determination may be true, whereas in a case that the transmitted and/or received identification information is not allowed, the first condition fulfillment determination may be false. Note that the conditions on which true or false of the first condition fulfillment determination is determined need not be limited to the conditions described above.

First, the case where the first condition fulfillment determination is true will be described. In the procedure of (A) of FIG. 7, first, the AMF can perform fourth condition fulfillment determination. The fourth condition fulfillment determination is a condition fulfillment determination for determining whether the AMF performs transmission and/or reception of an SM message to and/or from the SMF.

Note that the fourth condition fulfillment determination may be performed based on whether the AMF has received an SM message. The fourth condition fulfillment determination may be performed based on whether the registration request message includes an SM message. For example, in a case that the AMF receives an SM message, and/or that the registration request message includes an SM message, the fourth condition fulfillment determination may be true, whereas in a case that the AMF does not receive an SM message, and/or that the registration request message does not include an SM message, the fourth condition fulfillment determination may be false. Note that the conditions on which true or false of the fourth condition fulfillment determination is determined need not be limited to the conditions described above.

In a case that the fourth condition fulfillment determination is true, the AMF selects the SMF and performs transmission and/or reception of an SM message to and/or from the selected SMF, whereas in a case that the fourth condition fulfillment determination is false, the AMF does not perform the transmission and/or reception (S806). Even in a case that the fourth condition fulfillment determination is true, the AMF may cancel the procedure of (A) of FIG. 7, on the condition that the AMF receives an SM message indicating rejection from the SMF. In this case, the AMF can initiate the procedure of (B) of FIG. 7.

Note that, in a case that the AMF performs transmission and/or reception of an SM message to and/or from the SMF in S806, the AMF can notify the SMF of the identification information received in the registration request message. The SMF transmits and/or receives an SM message to and/or from the AMF, and can thereby acquire the identification information received from the AMF.

Next, the AMF transmits a Registration accept message to the UE via the 5G AN (or the gNB) as a response message to the registration request message, based on reception of the registration request message, and/or completion of transmission and/or reception of the SM message to and/or from the SMF (S808). For example, in a case that the fourth condition fulfillment determination is false, the AMF may transmit the registration accept message, based on reception of the registration request message from the UE. In a case that the fourth condition fulfillment determination is true, the AMF may transmit the registration accept message, based on completion of transmission and/or reception of the SM message to and/or from the SMF. Note that the registration accept message is a NAS message transmitted and/or received on the N1 interface; however, between the UE and the 5G AN (gNB), the registration accept message is transmitted and/or received being included in an RRC message.

The AMF may include at least one or more pieces of identification information out of the 11th identification information to the 14th identification information in the registration accept message for transmission. Note that, by transmitting these pieces of identification information, the AMF may indicate that the network supports each function, or may indicate that the request from the UE is accepted. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the network allows the onboarding service, the network may include one or more pieces of identification information out of identification information of the 11th identification information to the 14th identification information in the registration accept message. In addition, in a case that the network allows registration in which only the onboarding service is available, the network may include one or more pieces of identification information out of identification information of the 11th identification information to the 14th identification information in the registration accept message. In addition, in a case that the network allows use of the SNPN information provision procedure, the network may include one or more pieces of identification information out of identification information of the 11th identification information to the 14th identification information in the registration accept message.

In addition, in a case that the network supports the onboarding service, the network may include one or more pieces of identification information out of identification information of the 11th identification information to the 14th identification information in the registration accept message. In addition, in a case that the network supports the SNPN information provision procedure, the network may include one or more pieces of identification information out of identification information of the 11th identification information to the 14th identification information in the registration accept message.

In addition, in a case that the network can provide the SNPN information, the network may include one or more pieces of identification information out of identification information of the 11th identification information to the 14th identification information in the registration accept message. In addition, in a case that the network can perform the onboarding service, the network may include one or more pieces of identification information out of identification information of the 11th identification information to the 14th identification information in the registration accept message. In addition, in a case that the network can perform the SNPN information provision procedure, the network may include one or more pieces of identification information out of identification information of the 11th identification information to the 14th identification information in the registration accept message.

In addition, in a case that the network supports registration in which only the onboarding service is available, the network may include the 11th identification information in the registration accept message. More specifically, in a case that the network supports the onboarding service, the network may include the 11th identification information indicating that the network supports registration in which only the onboarding service is available in the registration accept message.

In addition, in a case that the network supports the SNPN information provision procedure, the network may include the 12th identification information indicating a type of SNPN information provision procedure supported by the network in the registration accept message. More specifically, in a case that the network supports the SNPN information provision procedure via the user plane, the network may include the 12th identification information indicating support of the SNPN information provision procedure via the user plane in the registration accept message. In addition, in a case that the network supports the SNPN information provision procedure via the control plane, the network may include the 12th identification information indicating support of the SNPN information provision procedure via the control plane in the registration accept message.

In addition, in a case that the network supports the SNPN information provision procedure via the user plane, the network may include the 13th identification information in the registration accept message. More specifically, in a case that the network supports the SNPN information provision procedure via the user plane, the network may include the 13th identification information indicating support of the SNPN information provision procedure via the user plane in the registration accept message.

In addition, in a case that the network supports the SNPN information provision procedure via the control plane, the network may include the 14th identification information in the registration accept message. More specifically, in a case that the network supports the SNPN information provision procedure via the control plane, the network may include the 14th identification information indicating support of the SNPN information provision procedure via the control plane in the registration accept message.

In addition, in a case that the network supports the SNPN information provision procedure via the control plane, the network may include the 14th identification information indicating support of the SNPN information provision procedure using the PCO or the ePCO in the registration accept message. In addition, in a case that the network supports the SNPN information provision procedure via the control plane, the network may include the 14th identification information indicating support of the SNPN information provision procedure using the URSP in the registration accept message.

In addition, by including one or more pieces of identification information out of identification information of the 11th identification information to the 14th identification information in the registration accept message, the network may indicate, to the UE, details indicated by the piece(s) of identification information included in the registration accept message. In addition, by including one or more pieces of identification information out of identification information of the 11th identification information to the 14th identification information in the registration accept message, the network may allow details indicated by the piece(s) of identification information included in the registration accept message, for the UE.

Note that the AMF may select and determine which piece of identification information out of the 11th to the 14th identification information is to be included in the registration accept message, based on each piece of received identification information, and/or subscriber information, and/or capability information of the network, and/or an operator policy, and/or a state of the network, and/or registration information of a user, and/or a context stored in the AMF, and/or the like.

The AMF can include an SM message (for example, the PDU session establishment accept message) in the registration accept message and transmit the registration accept message, or transmit an SM message (for example, the PDU session establishment accept message) together with the registration accept message. Note that the transmission method may be performed in a case that the SM message (for example, the PDU session establishment request message) is included in the registration request message and the fourth condition fulfillment determination is true. The transmission method may be performed in a case that the SM message (for example, the PDU session establishment request message) is included together with the registration request message and the fourth condition fulfillment determination is true. By performing such a transmission method as described above, the AMF can indicate that a procedure for SM is accepted in the registration procedure.

By transmitting the registration accept message based on each piece of received identification information, and/or subscriber information, and/or capability information of the network, and/or an operator policy, and/or a state of the network, and/or registration information of a user, and/or a context stored in the AMF, and/or the like, the AMF may indicate that the request from the UE is accepted.

In addition, the AMF may transmit information indicating that a part of the request from the UE is rejected in the registration accept message. The AMF may transmit information indicating that the part of the request from the UE is rejected so as to indicate a reason for rejection of the part of the request from the UE. In addition, by receiving the information indicating that the part of the request of the UE is rejected, the UE may recognize the reason for rejection of the part of the request from the UE. Note that the reason for rejection may be information indicating that details indicated by the identification information received by the AMF are not allowed.

The UE receives the registration accept message from the AMF via the 5G AN (gNB) (S808). By receiving the registration accept message, the UE can recognize that the request from the UE on the registration request message is accepted, and recognize details of various pieces of identification information included in the registration accept message.

The UE can further transmit a registration complete message to the AMF via the 5G AN (gNB) as a response message to the registration accept message (S810). Note that, in a case that the UE receives the SM message such as the PDU session establishment accept message, the UE may include an SM message such as a PDU session establishment complete message in the registration complete message and transmit the registration complete message, or may indicate that the procedure for SM has been completed by including the SM message. Here, the registration complete message is a NAS message transmitted and/or received over the N1 interface; however, between the UE and the 5G AN (gNB), the registration complete message is transmitted and/or received being included in an RRC message.

The AMF receives the registration complete message via the 5G AN (gNB) (S810). Each apparatus completes the procedure of (A) of FIG. 7, based on transmission and/or reception of the registration accept message and/or the registration complete message.

Next, a case that the first condition fulfillment determination is false will be described. In the procedure of (B) of FIG. 7, the AMF transmits a Registration reject message to the UE via the 5G AN (gNB) as a response message to the registration request message (S812). Here, the registration reject message is a NAS message transmitted and/or received over the N1 interface; however the registration reject message is included and transmitted and/or received in the RRC message between the UE and the 5G AN (gNB).

Here, the AMF may include at least the 21st identification information in the registration reject message for transmission. The AMF may transmit the 21st identification information to thereby indicate that the request from the UE is rejected, or indicate the reason why the request from the UE is rejected.

In a case that the network does not allow the onboarding service, the network may include the 21st identification information in the registration reject message. In addition, in a case that the network does not allow registration in which only the onboarding service is available, the network may include the 21st identification information in the registration reject message. In addition, in a case that the network does not allow use of the SNPN information provision procedure, the network may include the 21st identification information in the registration reject message.

In addition, in a case that the network does not support the onboarding service, the network may include the 21st identification information in the registration reject message. In addition, in a case that the network does not support the SNPN information provision procedure, the network may include the 21st identification information in the registration reject message.

In addition, in a case that the network cannot provide the SNPN information, the network may include the 21st identification information in the registration reject message. In addition, in a case that the network cannot perform the onboarding service, the network may include the 21st identification information in the registration reject message. In addition, in a case that the network cannot perform the SNPN information provision procedure, the network may include the 21st identification information in the registration reject message.

In addition, in a case that the network does not support registration in which only the onboarding service is available, the network may include the 21st identification information in the registration reject message. More specifically, in a case that the network does not support registration in which only the onboarding service is available, the network may include the 21st identification information indicating that the network does not support registration in which only the onboarding service is available in the registration reject message.

In addition, in a case that the network does not support the onboarding service, the network may include the 21st identification information indicating no support of the onboarding service in the registration reject message. In addition, in a case that the network does not support the SNPN information provision procedure, the network may include the 21st identification information indicating no support of the SNPN information provision procedure in the registration reject message.

In addition, in a case that the network does not support the requested SNPN information provision procedure, the network may include the 21st identification information indicating no support of the requested SNPN information provision procedure in the registration reject message. More specifically, in a case that the network does not support the SNPN information provision procedure via the user plane, the network may include the 21st identification information indicating no support of the SNPN information provision procedure via the user plane in the registration reject message. In addition, in a case that the network does not support the SNPN information provision procedure via the control plane, the network may include the 21st identification information indicating no support of the SNPN information provision procedure via the control plane in the registration reject message.

In addition, by including the 21st identification information in the registration reject message, the network may indicate, to the UE, details indicated by the identification information included in the registration reject message. In addition, by including the 21st identification information in the registration reject message, the network may disallow details indicated by the identification information included in the registration reject message, for the UE.

Note that the AMF may select and determine whether to include at least the 21st identification information in the registration reject message, based on each piece of received identification information, and/or subscriber information, and/or capability information of the network, and/or an operator policy, and/or a state of the network, and/or registration information of a user, and/or a context stored in the AMF, and/or the like.

In addition, the AMF may indicate that the request from the UE using the registration request message is rejected by transmitting the registration reject message. In addition, the AMF may transmit information indicating a reason for rejection in the registration reject message, or may indicate the reason for rejection by transmitting the reason for rejection. Moreover, by receiving the information indicating the reason for rejection of the request from the UE, the UE may recognize the reason for rejection of the request from the UE. Note that the reason for rejection may be information indicating that details indicated by the identification information received by the AMF are not allowed.

The UE receives the registration reject message from the AMF via the 5G AN (gNB) (S812). The UE can recognize that the request from the UE using the registration request message is rejected and the content of various kinds of identification information included in the registration reject message by receiving the registration reject message. In a case that the UE does not receive the registration reject message even after a prescribed time period has elapsed after transmitting the registration request message, the UE may recognize that the request from the UE is rejected. Each apparatus completes the procedure of (B) in the present procedure, based on transmission and/or reception of the registration reject message.

Figure 7:
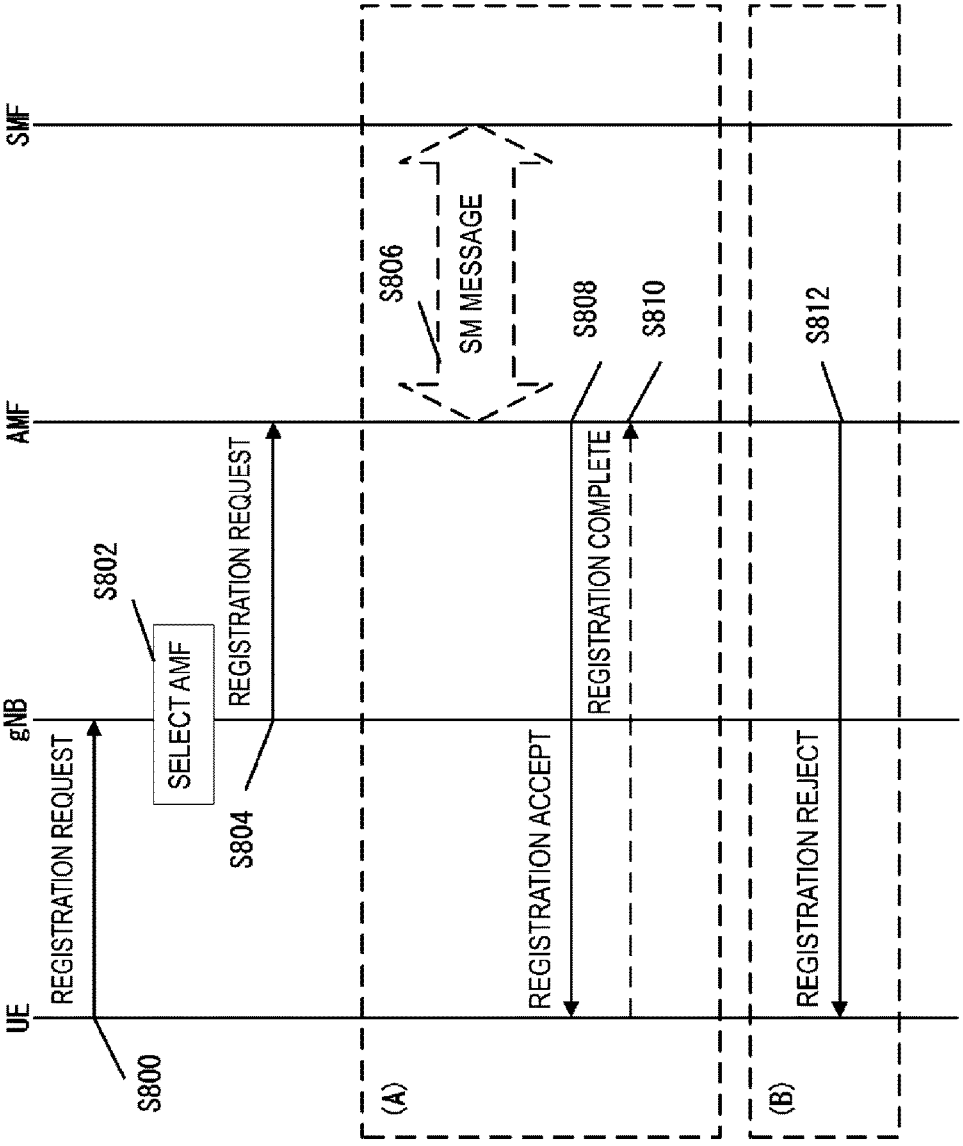
FIG. 7 is a diagram illustrating a registration procedure.

Note that the procedure of (B) of FIG. 7 may be initiated in a case that the procedure of (A) of FIG. 7 is cancelled. In the procedure of (A) of FIG. 7, in a case that the fourth condition fulfillment determination is true, the AMF may include an SM message indicating rejection such as a PDU session establishment reject message in the registration reject message and transmit the registration reject message, or may indicate that the procedure for SM is rejected by including the SM message indicating rejection. In that case, further, the UE may receive the SM message indicating rejection, such as the PDU session establishment reject message, or may recognize that the procedure for SM is rejected.

Each apparatus completes the registration procedure, based on completion of the procedure of (A) or (B) of FIG. 7. Note that each apparatus may transition to a state (RM-_REGISTERED state) in which the UE is registered with the network, based on completion of the procedure of (A) of FIG. 7, and may maintain a state (RM_DEREGISTERED state) in which the UE is not registered with the network or may transition to a state in which the UE is not registered with the network, based on completion of the procedure of (B) of FIG. 7. Transition of each apparatus to each state may be performed based on completion of the registration procedure, or may be performed based on establishment of a PDU session.

In addition, each apparatus may perform processing based on information transmitted and/or received in the registration procedure, based on completion of the registration procedure. For example, in a case that information indicating that a part of the request from the UE is rejected is transmitted and/or received, a reason for rejection of the request from the UE may be recognized. In addition, each apparatus may perform the present procedure again or may perform the registration procedure with the core network_B or another cell, based on the reason for rejection of the request from the UE.

Moreover, the UE may store the identification information received along with the registration accept message and/or the registration reject message or may recognize determination of the network, based on the completion of the registration procedure.

For example, in a case that the UE receives one or more pieces of identification information out of identification information of the 11th identification information to the 14th identification information, the UE may recognize that the onboarding service is allowed. In addition, in a case that the UE receives one or more pieces of identification information out of identification information of the 11th identification information to the 14th identification information, the UE may recognize that registration in which only the onboarding service is available is allowed. In addition, in a case that the UE receives one or more pieces of identification information out of identification information of the 11th identification information to the 14th identification information, the UE may recognize that use of the SNPN information provision procedure is allowed.

In addition, in a case that the UE receives one or more pieces of identification information out of identification information of the 11th identification information to the 14th identification information, the UE may recognize that the onboarding service is supported. In addition, in a case that the UE receives one or more pieces of identification information out of identification information of the 11th identification information to the 14th identification information, the UE may recognize that the SNPN information provision procedure is supported.

In addition, in a case that the UE receives one or more pieces of identification information out of identification information of the 11th identification information to the 14th identification information, the UE may recognize that the UE can provide the SNPN information of the network. In addition, in a case that the UE receives one or more pieces of identification information out of identification information of the 11th identification information to the 14th identification information, the UE may recognize that the UE can perform the onboarding service. In addition, in a case that the UE receives one or more pieces of identification information out of identification information of the 11th identification information to the 14th identification information, the UE may recognize that the UE can perform the SNPN information provision procedure.

In addition, in a case that the UE receives the 11th identification information, the UE may recognize that registration in which only the onboarding service is available is supported. More specifically, in a case that the UE receives the 11th identification information indicating that the network supports registration in which only the onboarding service is available, the UE may recognize that the onboarding service is supported.

In addition, in a case that the UE receives the 12th identification information indicating a type of SNPN information provision procedure supported by the network, the UE may recognize that the SNPN information provision procedure is supported. More specifically, in a case that the UE receives the 12th identification information indicating support of the SNPN information provision procedure via the user plane, the UE may recognize that the SNPN information provision procedure via the user plane is supported. In addition, in a case that the UE receives the 12th identification information indicating support of the SNPN information provision procedure via the control plane, the UE may recognize that the SNPN information provision procedure via the control plane is supported.

In addition, in a case that the UE receives the 13th identification information, the UE may recognize that the SNPN information provision procedure via the user plane is supported. More specifically, in a case that the UE receives the 13th identification information indicating support of the SNPN information provision procedure via the user plane, the UE may recognize that the SNPN information provision procedure via the user plane is supported.

In addition, in a case that the UE receives the 14th identification information, the UE may recognize that the SNPN information provision procedure via the control plane is supported. More specifically, in a case that the UE receives the 14th identification information indicating support of the SNPN information provision procedure via the control plane, the UE may recognize that the SNPN information provision procedure via the control plane is supported.

In addition, in a case that the UE receives the 14th identification information indicating support of the SNPN information provision procedure using the PCO or the ePCO, the UE may recognize that the SNPN information provision procedure via the control plane is supported, and may recognize that the SNPN information provision procedure using the PCO or the ePCO is supported. In addition, in a case that the UE receives the 14th identification information indicating support of the SNPN information provision procedure using the URSP, the UE may recognize that the SNPN information provision procedure via the control plane is supported, and may recognize that the SNPN information provision procedure using the URSP is supported.

In addition, in a case that the UE receives one or more pieces of identification information out of identification information of the 11th identification information to the 14th identification information, the UE may recognize details indicated by the received piece(s) of identification information. In addition, in a case that the UE receives one or more pieces of identification information out of identification information of the 11th identification information to the 14th identification information, the UE may recognize that details indicated by the piece(s) of identification information included in the registration accept message are allowed.

In addition, in a case that the UE receives one or more pieces of identification information out of identification information of the 11th identification information to the 14th identification information, the UE may recognize that establishment of a PDU session for a function other than the onboarding service is prohibited. In addition, in a case that the UE receives one or more pieces of identification information out of identification information of the 11th identification information to the 14th identification information, the UE may perform configuration so that establishment of a PDU session for a function other than the onboarding service is prohibited. In other words, in a case that the UE receives one or more pieces of identification information out of identification information of the 11th identification information to the 14th identification information, the UE may perform configuration so that the PDU session establishment procedure for a function other than the onboarding service is not initiated.

In addition, in a case that the UE receives one or more pieces of identification information out of identification information of the 11th identification information to the 14th identification information, the UE may recognize that establishment of a PDU session for a purpose other than the SNPN information provision procedure is prohibited. In addition, in a case that the UE receives one or more pieces of identification information out of identification information of the 11th identification information to the 14th identification information, the UE may perform configuration so that establishment of a PDU session for a purpose other than the SNPN information provision procedure is prohibited. In other words, in a case that the UE receives one or more pieces of identification information out of identification information of the 11th identification information to the 14th identification information, the UE may perform configuration so that the PDU session establishment procedure for a PDU session for a purpose other than the SNPN information provision procedure is not initiated. In addition, in a case that the UE receives one or more pieces of identification information out of identification information of the 11th identification information to the 14th identification information, the UE may perform configuration so that the PDU session establishment procedure for a purpose other than the SNPN information provision procedure is not initiated.

Note that a time period for which establishment of a PDU session for a purpose other than the SNPN information provision procedure is prohibited may be a time period managed by a timer. In other words, the UE may perform configuration so that establishment of a PDU session for a purpose other than the SNPN information provision procedure is not prohibited, based on expiration of the timer.

In addition, the time period for which establishment of a PDU session for a purpose other than the SNPN information provision procedure is prohibited may be a time period before a new registration procedure and/or the de-registration procedure is performed. In other words, the UE may perform configuration so that establishment of a PDU session for a purpose other than the SNPN information provision procedure is not prohibited, based on performing of the new registration procedure and/or the de-registration procedure.

In addition, the time period for which establishment of a PDU session for a purpose other than the SNPN information provision procedure is prohibited may be a time period before power is turned off and/or a USIM is removed. In other words, the UE may perform configuration so that establishment of a PDU session for a purpose other than the SNPN information provision procedure is not prohibited, based on power off and/or removal of the USIM.

Here, the PDU session for a purpose other than the SNPN information provision procedure may be a regular PDU session. More specifically, the PDU session for a purpose other than the SNPN information provision procedure may be a regular PDU session for performing transmission and/or reception of user data.

In addition, the PDU session for a purpose other than the SNPN information provision procedure may be a PDU session for a purpose other than the onboarding service. In addition, the PDU session for a purpose other than the SNPN information provision procedure may be a PDU session for a function other than the onboarding service.

For example, the PDU session for a purpose other than the SNPN information provision procedure may be a PDU session for a purpose of an IMS service. In addition, the PDU session for a purpose other than the SNPN information provision procedure may be a PDU session for a purpose of the emergency service. In addition, the PDU session for a purpose other than the SNPN information provision procedure may be a PDU session for a purpose of the LADN. In addition, the PDU session for a purpose other than the SNPN information provision procedure may be a PDU session for a purpose of CIoT.

In other words, the PDU session for a purpose other than the SNPN information provision procedure may be a PDU session for the IMS service. In addition, the PDU session for a purpose other than the SNPN information provision procedure may be a PDU session for the emergency service. In addition, the PDU session for a purpose other than the SNPN information provision procedure may be a PDU session for the LADN. In addition, the PDU session for a purpose other than the SNPN information provision procedure may be a PDU session for the CIoT.

In addition, the PDU session establishment procedure for a purpose other than the SNPN information provision procedure may be a PDU session establishment procedure for the IMS service. In addition, the PDU session establishment procedure for a purpose other than the SNPN information provision procedure may be a PDU session establishment procedure for the emergency service. In addition, the PDU session establishment procedure for a purpose other than the SNPN information provision procedure may be a PDU session establishment procedure for the LADN. In addition, the PDU session establishment procedure for a purpose other than the SNPN information provision procedure may be a PDU session establishment procedure for the CIoT.

Note that the above is not restrictive, and the PDU session for a purpose other than the SNPN information provision procedure may be any PDU session as long as other than the PDU session established and used for the SNPN information provision procedure.

In addition, in a case that the UE receives the 12th identification information indicating a type of SNPN information provision procedure supported by the network, the UE may recognize a type of allowed SNPN information provision procedure. More specifically, in a case that the UE receives the 12th identification information indicating support of the SNPN information provision procedure via the user plane, the UE may recognize that use of the SNPN information provision procedure via the user plane is allowed. In addition, in a case that the UE receives the 12th identification information indicating support of the SNPN information provision procedure via the control plane, the UE may recognize that use of the SNPN information provision procedure via the control plane is allowed.

In addition, in a case that the UE receives the 13th identification information, the UE may recognize that use of the SNPN information provision procedure via the user plane is allowed. More specifically, in a case that the UE receives the 13th identification information indicating support of the SNPN information provision procedure via the user plane, the UE may recognize that use of the SNPN information provision procedure via the user plane is allowed.

In addition, in a case that the UE receives the 14th identification information, the UE may recognize that use of the SNPN information provision procedure via the control plane is allowed. More specifically, in a case that the UE receives the 14th identification information indicating support of the SNPN information provision procedure via the control plane, the UE may recognize that use of the SNPN information provision procedure via the control plane is allowed.

In addition, in a case that the UE receives one or more pieces of identification information out of identification information of the 11th identification information to the 14th identification information, the UE may determine whether to establish a PDU session. In other words, in a case that the UE receives one or more pieces of identification information out of identification information of the 11th identification information to the 14th identification information, the UE may determine whether to initiate the PDU session establishment procedure for establishing a PDU session.

For example, in a case that the UE receives one or more pieces of identification information out of identification information of the 11th identification information to the 14th identification information, the UE may initiate the PDU session establishment procedure for establishing a PDU session, or may establish a PDU session. In addition, in a case that the UE receives the 12th identification information indicating support of the SNPN information provision procedure via the user plane, the UE may initiate the PDU session establishment procedure for establishing a PDU session, or may establish a PDU session. In addition, in a case that the UE receives the 13th identification information, the UE may initiate the PDU session establishment procedure for establishing a PDU session, or may establish a PDU session.

Conversely, in a case that the UE receives one or more pieces of identification information out of identification information of the 11th identification information to the 14th identification information, the UE may perform configuration so that the PDU session establishment procedure for establishing a PDU session is not initiated, or need not establish a PDU session. In addition, in a case that the UE receives the 12th identification information indicating support of the SNPN information provision procedure via the control plane, the UE may perform configuration so that the PDU session establishment procedure for establishing a PDU session is not initiated, or need not establish a PDU session. In addition, in a case that the UE receives the 14th identification information, the UE may perform configuration so that the PDU session establishment procedure for establishing a PDU session is not initiated, or need not establish a PDU session.

In addition, in a case that the UE receives the 14th identification information indicating support of the SNPN information provision procedure using the PCO or the ePCO, the UE may initiate the PDU session establishment procedure. Conversely, in a case that the UE receives the 14th identification information indicating support of the SNPN information provision procedure using the URSP, the UE need not initiate the PDU session establishment procedure.

In other words, in a case that the SNPN information provision procedure using the PCO or the ePCO is supported and/or allowed, the UE may initiate the PDU session establishment procedure. Conversely, in a case that the SNPN information provision procedure using the URSP is supported and/or allowed, the UE need not initiate the PDU session establishment procedure.

In addition, in a case that the UE performs the SNPN information provision procedure using the PCO or the ePCO, the UE may initiate the PDU session establishment procedure. Conversely, in a case that the UE performs the SNPN information provision procedure using the URSP, the UE need not initiate the PDU session establishment procedure.

Here, the PDU session may be a PDU session used in the SNPN information provision procedure. In other words, the PDU session may be a PDU session for a purpose of the SNPN information provision procedure. In addition, the PDU session may be a PDU session for the SNPN information provision procedure.

In addition, the PDU session may be a PDU session used in the onboarding service. In other words, the PDU session may be a PDU session for a purpose of the onboarding service. In addition, the PDU session may be a PDU session for the onboarding service.

In addition, the PDU session establishment procedure may be a PDU session establishment procedure for a purpose of the SNPN information provision procedure. In addition, the PDU session establishment procedure may be a PDU session establishment procedure for the SNPN information provision procedure. In addition, the PDU session establishment procedure may be a PDU session establishment procedure for establishing a PDU session for a purpose of the SNPN information provision procedure. In addition, the PDU session establishment procedure may be a PDU session establishment procedure for the SNPN information provision procedure.

In addition, the PDU session establishment procedure may be a PDU session establishment procedure for a purpose of the onboarding service. In addition, the PDU session establishment procedure may be a PDU session establishment procedure for the onboarding service. In addition, the PDU session establishment procedure may be a PDU session establishment procedure for establishing a PDU session for the onboarding service. In addition, the PDU session establishment procedure may be a PDU session establishment procedure for the onboarding service.

In addition, in a case that the UE receives one or more pieces of identification information out of identification information of the 11th identification information to the 14th identification information, the UE may start a timer. In addition, the UE may initiate the de-registration procedure, based on expiration of the timer.

In addition, in a case that the network transmits one or more pieces of identification information out of identification information of the 11th identification information to the 14th identification information, the network may start a timer. In addition, the network may initiate the de-registration procedure, based on expiration of the timer.

Here, the timer may be a timer indicating a period of time for which registration in which only the onboarding service is available is enabled. In other words, the timer may be a timer indicating a period of time in which the SNPN information provision procedure can be performed.

In addition, in a case that the UE receives the 21st identification information, the UE may recognize that the onboarding service is not allowed. In addition, in a case that the UE receives the 21st identification information, the UE may recognize that registration in which only the onboarding service is available is not allowed. In addition, in a case that the UE receives the 21st identification information, the UE may recognize that use of the SNPN information provision procedure is allowed.

In addition, in a case that the UE receives the 21st identification information, the UE may recognize that the onboarding service is not supported. In addition, in a case that the UE receives the 21st identification information, the UE may recognize that the SNPN information provision procedure is not supported.

In addition, in a case that the UE receives the 21st identification information, the UE may recognize that the SNPN information cannot be provided and/or acquired. In addition, in a case that the UE receives the 21st identification information, the UE may recognize that the onboarding service cannot be performed. In addition, in a case that the UE receives the 21st identification information, the UE may recognize that the SNPN information provision procedure cannot be performed.

In addition, in a case that the UE receives the 21st identification information, the UE may recognize that registration in which only the onboarding service is available is not supported. More specifically, in a case that the UE receives the 21st identification information indicating that the network does not support registration in which only the onboarding service is available, the UE may recognize that registration in which only the onboarding service is available is not supported.

In addition, in a case that the UE receives the 21st identification information indicating no support of the onboarding service, the UE may recognize that the onboarding service is not supported. In addition, in a case that the UE receives the 21st identification information indicating no support of the SNPN information provision procedure, the UE may recognize that the SNPN information provision procedure is not supported.

In addition, in a case that the UE receives the 21st identification information indicating no support of the requested SNPN information provision procedure, the UE may recognize that the requested SNPN information provision procedure is not supported. More specifically, in a case that the UE receives the 21st identification information indicating no support of the SNPN information provision procedure via the user plane, the UE may recognize that the SNPN information provision procedure via the user plane is not supported. In addition, in a case that the UE receives the 21st identification information indicating no support of the SNPN information provision procedure via the control plane, the UE may recognize that the SNPN information provision procedure via the control plane is not supported.

In addition, in a case that the UE receives the 21st identification information, the UE may recognize details indicated by the received identification information. In addition, in a case that the UE receives the 21st identification information, the UE may recognize that details indicated by the received identification information are not allowed.

In addition, in a case that the UE receives the 21st identification information, the UE may add the identification information of the network to the first list. In addition, in a case that the UE receives the 21st identification information, the UE may create the first list, and add the identification information of the network to the created first list.

More specifically, in a case that the UE receives the 21st identification information indicating no support of the SNPN information provision procedure, the UE may add the identification information of the network to the first list. In addition, in a case that the UE receives the 21st identification information indicating no support of the onboarding service, the UE may add the identification information of the network to the first list. In addition, in a case that the UE receives the 21st identification information indicating that the network does not support registration in which only the onboarding service is available, the UE may add the identification information of the network to the first list.

Here, the identification information of the network may be information for identifying the network in which the UE is currently located. More specifically, in a case that the UE is located in the PLMN, the identification information of the network may be information for identifying the PLMN in which the UE is currently located. Conversely, in a case that the UE is located in the SNPN, the identification information of the network may be information for identifying the SNPN in which the UE is currently located.

For example, in a case that the present procedure is performed in a first network, the identification information of the network may be information for identifying the first network. More specifically, in a case that the present procedure is performed in a first PLMN, the identification information of the network may be information for identifying the first PLMN. In addition, in a case that the present procedure is performed in a first SNPN, the identification information of the network may be information for identifying the first SNPN.

Note that a time period for which the first list is maintained may be a time period managed by a timer. In other words, the UE may release or delete the first list, based on expiration of the timer.

In addition, the time period for which the first list is maintained may be a time period until the SNPN information provision procedure completes. In other words, the UE may release or delete the first list, based on completion of the SNPN information provision procedure.

In addition, the time period for which the first list is maintained may be a time period until the onboarding service completes. In other words, the UE may release or delete the first list, based on completion of the onboarding service.

In addition, the time period for which the first list is maintained may be a time period until provision and/or acquisition of the SNPN information completes. In other words, the UE may release or delete the first list, based on completion of acquisition of the SNPN information.

In addition, the time period for which the first list is maintained may be a time period until the de-registration procedure and/or second network selection is performed. In other words, the UE may release or delete the first list, based on performing of the de-registration procedure and/or second network selection.

In addition, the time period for which the first list is maintained may be a time period until power is turned off and/or a USIM is removed. In other words, the UE may release or delete the first list, based on power off and/or removal of the USIM.

In addition, in a case that the UE receives the 21st identification information, the UE may re-perform first network selection. In addition, in a case that the UE receives the 21st identification information, the UE may re-perform the first network selection, and select another network different from the network in which the UE is currently located. In addition, after the UE completes re-performing the first network selection, the UE may initiate the registration procedure in the new selected network.

More specifically, in a case that the UE receives the 21st identification information indicating no support of the SNPN information provision procedure, the UE may re-perform the first network selection. In addition, in a case that the UE receives the 21st identification information indicating no support of the onboarding service, the UE may re-perform the first network selection. In addition, in a case that the UE receives the 21st identification information indicating that the network does not support registration in which only the onboarding service is available, the UE may re-perform the first network selection.

In addition, in a case that the UE receives the 21st identification information, the UE may start a timer. Here, the timer may be a timer indicating a period of time for which the first list is managed. In other words, the UE may release or delete the first list, based on expiration of the timer.

In addition, the timer may be a timer indicating a period of time for which the registration procedure is prohibited. In other words, the UE may initiate the registration procedure, based on expiration of the timer.

Note that a behavior performed in a case that each piece of identification information is received may be performed based on the received piece of identification information. For example, a behavior performed in a case that the 11th identification information is received may be performed based on the received 11th identification information. In addition, a behavior performed in a case that the 12th identification information is received may be performed based on the received 12th identification information. In addition, a behavior performed in a case that the 13th identification information is received may be performed based on the received 13th identification information. In addition, a behavior performed in a case that the 14th identification information is received may be performed based on the received 14th identification information. In addition, a behavior performed in a case that the 21st identification information is received may be performed based on the received 21st identification information.

3.2.2. PDU Session Establishment Procedure

Next, an overview of the PDU session establishment procedure performed for establishing a PDU session with respect to the DN will be described with reference to FIG. 8. The PDU session establishment procedure is a procedure in the 5GS. The present procedure hereinafter refers to the PDU session establishment procedure. The PDU session establishment procedure is a procedure for each apparatus to establish a PDU session. Note that each apparatus can initiate the PDU session establishment procedure at any timing after completing the registration procedure and being in the registered state. Each apparatus may be able to perform the PDU session establishment procedure during the registration procedure. Each apparatus may establish a PDU session based on completion of the PDU session establishment procedure.

Note that the PDU session establishment procedure may be a procedure initiated by the UE, or may be a procedure initiated in response to a request from the UE. In other words, the PDU session establishment procedure may be a PDU session establishment procedure requested by the UE. Each apparatus can establish multiple PDU sessions by performing the PDU session establishment procedure multiple times.

Here, in a case that the PDU session establishment procedure is a PDU session establishment procedure for establishing a PDU session for the LADN, each apparatus may establish the PDU session for the LADN, based on completion of the PDU session establishment procedure. In other words, in a case that the PDU session establishment procedure is a PDU session establishment procedure using the LADN DNN, each apparatus may establish a PDU session for the LADN, based on completion of the PDU session establishment procedure.

In addition, in a case that the UE is located in an area in which connection to an LADN is possible and/or that the UE is located in an LADN service area, the UE may initiate the PDU session establishment procedure in order to establish a PDU session for the LADN. Conversely, in a case that the UE is located outside the LADN service area, the UE may be prohibited from performing the PDU session establishment procedure for establishing a PDU session for the LADN.

In other words, in a case that the UE is located in an area in which connection to an LADN is possible and/or that the UE is located in an LADN service area, each apparatus may perform the PDU session establishment procedure in order to establish a PDU session for the LADN. Conversely, in a case that the UE is located outside the LADN service area, the network apparatus may reject the request for the PDU session establishment procedure for establishing a PDU session for the LADN.

First, the UE transmits a NAS message including a PDU session establishment request message to the SMF via the 5G AN (gNB) and the AMF (S900) (S902) (S904), and thereby initiates the PDU session establishment procedure.

Specifically, the UE transmits a NAS message including a PDU session establishment request message to the AMF via the 5G AN (gNB) via the N1 interface (S900). Note that the NAS message including the PDU session establishment request message may be an MM message. In addition, the MM message may be an uplink NAS transport (UL NAS TRANSPORT) message. Here, the expression "identification information and/or a value is included in the PDU session establishment request message" may mean that the identification information and/or the value is included in the MM message including the PDU session establishment request message.

Here, the UE can include one or more pieces of identification information in the PDU session establishment request message and/or the NAS message and transmit the PDU session establishment request message and/or the NAS message; however, the UE may include the one or more pieces of identification information in a control message different from the above, for example, a control message of a layer (e.g., the MAC layer, the RLC layer, or the PDCP layer) lower than the RRC layer and transmit the control message. Being included in these messages, these pieces of identification information may indicate a request from the UE. Furthermore, in a case that multiple pieces of identification information are transmitted and/or received, two or more pieces of identification information of these pieces of identification information may be configured as one or more pieces of identification information.

After the AMF receives the NAS message including the PDU session establishment request message (S900), the AMF extracts the PDU session establishment request message from the NAS message, and selects an SMF as a transfer destination of the PDU session establishment request message (S902). Note that the AMF may select the SMF as a transfer destination, based on each piece of identification information included in the PDU session establishment request message and/or the NAS message, and/or subscriber information, and/or capability information of the network, and/or an operator policy, and/or a state of the network, and/or registration information of a user, and/or a context stored in the AMF, and/or the like.

The AMF transfers the PDU session establishment request message to the selected SMF via the N11 interface (S904).

After the SMF receives the PDU session establishment request message (S904), the SMF recognizes various pieces of identification information included in the PDU session establishment request message. Then, the SMF performs third condition fulfillment determination. The third condition fulfillment determination is a condition fulfillment determination for determining whether the SMF accepts the request from the UE. In the third condition fulfillment determination, the SMF determines whether the third condition fulfillment determination is true or false. In a case that the third condition fulfillment determination is true, the SMF initiates a procedure of (A) in FIG. 8. In a case that the third condition fulfillment determination is false, the SMF initiates a procedure of (B) in FIG. 8.

Note that the third condition fulfillment determination may be performed based on the PDU session establishment request message, and/or each piece of identification information included in the PDU session establishment request message, and/or subscriber information, and/or capability information of the network, and/or an operator policy, and/or a state of the network, and/or registration information of a user, and/or a context stored in the SMF, and/or the like. For example, in a case that the network allows the request from the UE, the third condition fulfillment determination may be true. In a case that the network does not allow the request from the UE, the third condition fulfillment determination may be false. In addition, in a case that a destination network to which the UE is to be connected and/or an apparatus in the network supports the function requested by the UE, the third condition fulfillment determination may be true, whereas in a case that the destination network and/or the apparatus does not support the function requested by the UE, the third condition fulfillment determination may be false. In addition, in a case that the transmitted and/or received identification information is allowed, the third condition fulfillment determination may be true, whereas in a case that the transmitted and/or received identification information is not allowed, the third condition fulfillment determination may be false. Note that the conditions for determining true or false of the third condition fulfillment determination need not be limited to the conditions described above.

Now, steps in a case that the third condition fulfillment determination is true, in other words, each step of the procedure of (A) in FIG. 8 will be described. The SMF selects destination UPF(s) with which a PDU session is to be established and transmits a session establishment request message to the selected UPF(s) via the N4 interface (S906), and thereby initiates the procedure of (A) of FIG. 8.

In this regard, the SMF may select one or more UPFs, based on each piece of identification information acquired based on the reception of the PDU session establishment request message, and/or subscriber information, and/or capability information of the network, and/or an operator policy, and/or a state of the network, and/or registration information of a user, and/or the context stored in the SMF, and/or the like. Note that, in a case that multiple UPFs are selected, the SMF may transmit the session establishment request message to each of the UPFs.

Each UPF receives the session establishment request message from the SMF via the N4 interface (S906), and creates a context for the PDU session. In addition, the UPF transmits a session establishment response message to the SMF via the N4 interface, based on reception of the session establishment request message and/or creation of the context for the PDU session (S908).

The SMF receives the session establishment response message from the UPF via the N4 interface as a response message to the session establishment request message (S908). The SMF may perform address allocation for an address to be allocated to the UE, based on reception of the PDU session establishment request message and/or selection of the UPF, and/or reception of the session establishment response message.

The SMF transmits a PDU session establishment accept message to the UE via the AMF, based on reception of the PDU session establishment request message, and/or selection of the UPF, and/or reception of the session establishment response message, and/or completion of address allocation of an address to be allocated to the UE (S910) (S912).

Specifically, after the SMF transmits the PDU session establishment accept message to the AMF via the N11 interface (S910), the AMF that has received the PDU session establishment request message transmits a NAS message including the PDU session establishment accept message to the UE via the N1 interface (S912). Note that the PDU session establishment accept message may be a NAS message, and may be a response message to the PDU session establishment request. In addition, the PDU session establishment accept message may be included and transmitted and/or received in the MM message via the N1 interface. In addition, the MM message may be a NAS message, or may be a downlink NAS transport (DL NAS TRANSPORT) message. Here, the expression "identification information and/or a value is included in the PDU session establishment accept message" may mean that the identification information and/or the value is included in the MM message including the PDU session establishment accept message. The PDU session establishment accept message can indicate that establishment of a PDU session is accepted.

Here, by transmitting the PDU session establishment accept message, the SMF and the AMF may indicate that the request from the UE represented by the PDU session establishment request is accepted.

The SMF and the AMF may include one or more pieces of identification information in the PDU session establishment accept message for transmission. Note that, by transmitting these pieces of identification information, the SMF and the AMF may indicate that the network supports each function, or may indicate that the request from the UE is accepted. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Note that the SMF and the AMF may select and determine whether to include one or more pieces of identification information in the PDU session establishment accept message, based on each piece of received identification information, and/or subscriber information, and/or capability information of the network, and/or an operator policy, and/or a state of the network, and/or registration information of a user, and/or a context stored in the AMF, and/or the like.

The SMF and the AMF can include the selected and/or allowed PDU session ID in the PDU session establishment accept message. The SMF and the AMF can specify a PDU session type indicating a type of the selected and/or allowed PDU session. As the PDU session type, as described above, one of IPv4, IPv6, IPv4v6, Ethernet, and Unstructured can be specified. The SMF and the AMF can include the SSC mode of the selected and/or allowed PDU session in the PDU session establishment accept message.

In addition, the SMF and the AMF can include an authorized QoS rule group in the PDU session establishment accept message. Note that the authorized QoS rule group may include one or multiple QoS rules. In addition, in the present procedure, in a case that multiple QoS flows and/or user plane radio bearers are established, the approved QoS rule group may include multiple QoS rules. In contrast, in the present procedure, in a case that only one QoS flow and/or user plane radio bearer is established, the approved QoS rule group may include one QoS rule.

In addition, the SMF may transmit information indicating that a part of the request from the UE is rejected in the PDU session establishment accept message, or may transmit information indicating that the part of the request from the UE is rejected so as to indicate a reason for rejection of the part of the request from the UE. In addition, by receiving the information indicating that the part of the request from the UE is rejected, the UE may recognize the reason for rejection of the part of the request from the UE. Note that the reason for rejection may be information indicating that the contents indicated by the identification information received by the SMF are not allowed.

The UE receives the PDU session establishment accept message from the SMF (S910) (S912). Specifically, the PDU session establishment accept message is transmitted from the SMF to the AMF (S910), and then the UE receives a NAS message including the PDU session establishment accept message from the AMF via the N1 interface (S912). The UE may transmit a PDU session establishment complete message to the SMF via the AMF, based on reception of the PDU session establishment accept message and/or the NAS message including the PDU session establishment accept message (S914) (S916). By receiving the PDU session establishment accept message, the UE can detect that the request from the UE represented by the PDU session establishment request is accepted.

Specifically, the UE transmits the PDU session establishment complete message to the AMF via the N1 interface (S914). After the AMF receives the PDU session establishment complete message from the UE, the AMF transmits the PDU session establishment complete message to the SMF via the N11 interface (S916).

Note that the PDU session establishment complete message that is transmitted by the AMF to the SMF may be a response message to the PDU session establishment accept message that is transmitted from the SMF to the AMF in S910. The PDU session establishment complete message may be a NAS message. The PDU session establishment complete message may be any message as long as indicating that the PDU session establishment procedure completes.

After the SMF receives the PDU session establishment complete message from the AMF via the N11 interface (S916), the SMF can perform second condition fulfillment determination. The second condition fulfillment determination is a condition fulfillment determination for determining a type of a transmitted and/or received message on the N4 interface. In a case that the second condition fulfillment determination is true, the SMF transmits a session modification request message to the UPF via the N4 interface (S918), and then receives a session modification accept message transmitted from the UPF as a response message to the session modification request message (S920). In a case that the second condition fulfillment determination is false, the SMF transmits a session establishment request message to the UPF via the N4 interface (S918), and then receives a session modification accept message transmitted from the UPF as a response message to the session establishment request message (S920).

Note that the second condition fulfillment determination may be performed based on whether a session on the N4 interface for a PDU session is established. For example, in a case that a session on the N4 interface for a PDU session is established, the second condition fulfillment determination may be true, whereas in a case that a session on the N4 interface for a PDU session is not established, the second condition fulfillment determination may be false. Note that the conditions for determining true or false of the second condition fulfillment determination need not be limited to the conditions described above.

Each apparatus completes the procedure of (A) in the PDU session establishment procedure, based on transmission and/or reception of the PDU session establishment complete message, and/or transmission and/or reception of the session modification response message, and/or transmission and/or reception of the session establishment response message. In a case that the procedure of (A) of the present procedure is completed, the UE is in a state in which a PDU session with respect to the DN is established. Here, in a case that the PDU session establishment procedure is a PDU session establishment procedure for establishing a PDU session for the LADN, each apparatus may establish the PDU session for the LADN, based on completion of the procedure of (A) in the present procedure.

Next, steps of the procedure of (B) in the PDU session establishment procedure will be described. The SMF transmits the PDU session establishment reject message to the UE via the AMF (S922) (S924). Specifically, the SMF transmits the PDU session establishment reject message to the AMF via the N11 interface (S922). After the AMF receives the PDU session establishment request message from the SMF via the N11 interface (S922), the AMF transmits the PDU session establishment reject message to the UE via the N1 interface (S924).

Note that the PDU session establishment reject message may be a NAS message, or may be an SM message transmitted from the SMF to the UE. The PDU session establishment reject message may be any message as long as indicating that establishment of a PDU session is rejected. In addition, the PDU session establishment reject message may be included in the MM message for transmission and/or reception via the N1 interface. In addition, the MM message may be the NAS message, or may be a downlink NAS transport (DL NAS TRANSPORT) message. Here, the expression "identification information and/or a value is included in the PDU session establishment reject message" may mean that the identification information and/or the value is included in the MM message including the PDU session establishment reject message.

Here, by transmitting the PDU session establishment reject message, the SMF may indicate that the request from the UE represented by the PDU session establishment request is rejected. Furthermore, the SMF may transmit information indicating the reason for rejection in the PDU session establishment reject message, or may transmit the reason for rejection to indicate the reason for rejection. Moreover, by receiving the information indicating the reason for rejection of the request from the UE, the UE may recognize the reason for rejection of the request from the UE. Note that the reason for rejection may be information indicating that the contents indicated by the identification information received by the SMF are not allowed.

The SMF and/or the AMF may transmit one or more pieces of identification information and/or a back-off timer value in the PDU session establishment reject message. The SMF and/or the AMF may transmit these pieces of identification information and/or back-off timer value to thereby indicate that the request from the UE is rejected or indicate the reason why the request from the UE is rejected.

In addition, the SMF and/or the AMF may transmit the back-off timer value to thereby indicate to the UE to set the back-off timer value equal to a value to be transmitted or indicate to the UE to start the back-off timer configured with the transmitted value.

Note that the SMF and/or the AMF may select and determine whether to include one or more pieces of identification information in the PDU session establishment reject message, based on each piece of received identification information, and/or subscriber information, and/or capability information of the network, and/or an operator policy, and/or a state of the network, and/or registration information of a user, and/or a context stored in the AMF, and/or the like.

By receiving the PDU session establishment reject message, the UE can recognize that the request from the UE represented by the PDU session establishment request is rejected, and details of various pieces of identification information included in the PDU session establishment reject message.

Figure 8:
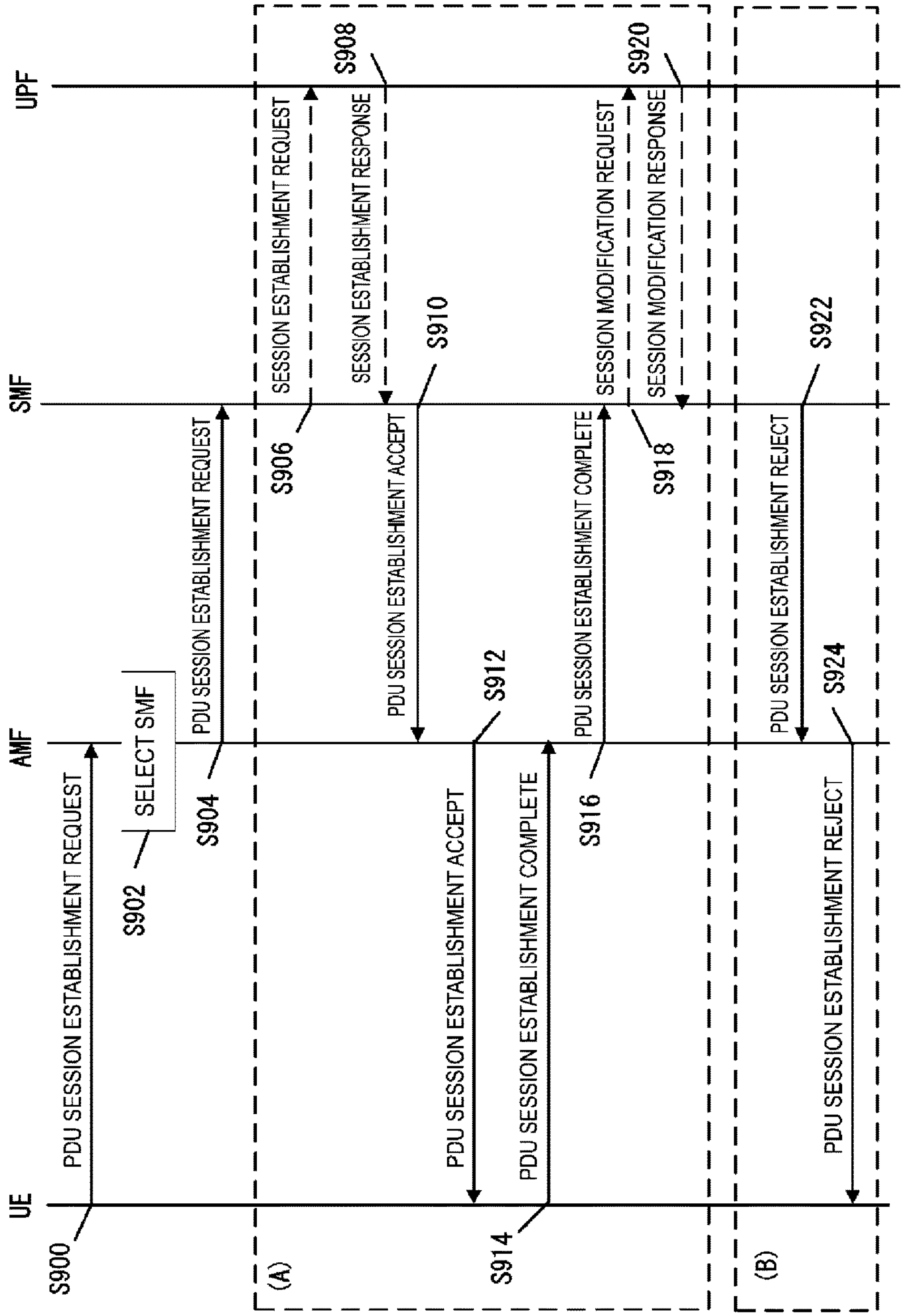
FIG. 8 is a diagram illustrating a PDU session establishment procedure.

Each apparatus completes the PDU session establishment procedure, based on completion of the procedure of (A) or (B) of FIG. 8. Note that each apparatus may transition to a state in which a PDU session is established, based on completion of the procedure of (A) of FIG. 8, or may recognize that the PDU session establishment procedure is rejected or may transition to a state in which a PDU session is not established, based on completion of the procedure of (B) of FIG. 8. In addition, after completing the procedure of (A) of FIG. 8, the UE can communicate with the DN using the established PDU session.

In addition, each apparatus may perform processing based on information transmitted and/or received in the PDU session establishment procedure, based on completion of the PDU session establishment procedure. For example, in a case that each apparatus transmits and/or receives information indicating that a part of the request from the UE is rejected, each apparatus may recognize a reason for rejection of the request from the UE. In addition, each apparatus may perform the present procedure again or may perform the PDU session establishment procedure with respect to another cell, based on the reason for rejection of the request from the UE.

In addition, based on completion of the PDU session establishment procedure, the UE may store identification information received together with the PDU session establishment accept message and/or the PDU session establishment reject message, or may recognize determination of the network.

In addition, in a case that the UE receives a back-off timer value, the UE may configure the back-off timer value for the back-off timer, or start the back-off timer configured with the received back-off timer value.

3.2.3. De-Registration Procedure

Next, the De-registration procedure will be described. The de-registration procedure is hereinafter also referred to as the present procedure. The de-registration procedure is a procedure initiated by the UE or the network, and is a procedure for canceling registration of the UE. The de-registration procedure may be a procedure for changing the state of the UE to the deregistered state.

In a case that the UE is in a state of being registered with the network, the UE and the network can perform the present procedure at any timing. In other words, in a case that the UE is in the registered state, the UE and the network can initiate the present procedure at any timing. Each apparatus (in particular, the UE and the AMF) can transition to the deregistered state, based on completion of the registration procedure.

In addition, the apparatus in the core network, such as the AMF, may initiate the present procedure, based on update of a configuration of the network and/or update of an operator policy. Note that a trigger of the present procedure may be detection of mobility of the UE, may be detection of state change of the UE, and/or the access network, and/or the core network, or may be state change of the network slice. In addition, the trigger of the present procedure may be reception of a request from the DN and/or an application server of the DN, change of a configuration of the network, or change of an operator policy. In addition, the trigger of the present procedure may be expiration of a running timer. Note that the trigger for the apparatus in the core network to initiate the present procedure is not limited to these. In addition, the present procedure may be performed at any timing on the condition that each apparatus is in a state in which each apparatus has established a 5GMM context and/or each apparatus is in a state in which each apparatus is in the 5GMM connected mode.

In addition, the trigger of the present procedure may be completion of the SNPN information provision procedure. In other words, the trigger of the present procedure may be completion of provision of the SNPN information. In addition, the trigger of the present procedure may be completion of the onboarding service.

In addition, the trigger of the present procedure may be expiration of a timer. Here, the timer may be a timer managed by the UE and/or the network. More specifically, the timer may be a timer indicating a period of time for which registration in which only the onboarding service is available is enabled. In other words, the timer may be a timer indicating a period of time in which the SNPN information provision procedure can be performed.

During the present procedure, each apparatus may transmit and/or receive a message including identification information indicating a reason why registration of the UE is canceled and/or identification information indicating that the network needs to be re-selected. In addition, each apparatus may release the context of the UE, or may initiate a behavior indicated by the network, based on completion of the present procedure.

The UE may recognize the reason why registration of the UE is canceled, based on control information transmitted and/or received in the present procedure. In addition, with recognizing the reason why registration of the UE is canceled, the UE may release the context of the UE, or may initiate re-selection of the network. In other words, the apparatus in the core network may cause the UE to recognize the reason why registration of the UE is canceled, by initiating the present procedure and further transmitting a control message and control information of the present procedure to the UE. In addition, by causing the UE to recognize the reason why registration of the UE is canceled, the apparatus in the core network may cause the UE to release the context of the UE, or may cause the UE to initiate re-selection of the network.

Note that the de-registration procedure includes a network-initiated de-registration procedure and a UE-initiated de-registration procedure. The network-initiated de-registration procedure and the UE-initiated de-registration procedure will be described below.

3.2.3.1. Network-Initiated De-Registration Procedure

Figure 9:
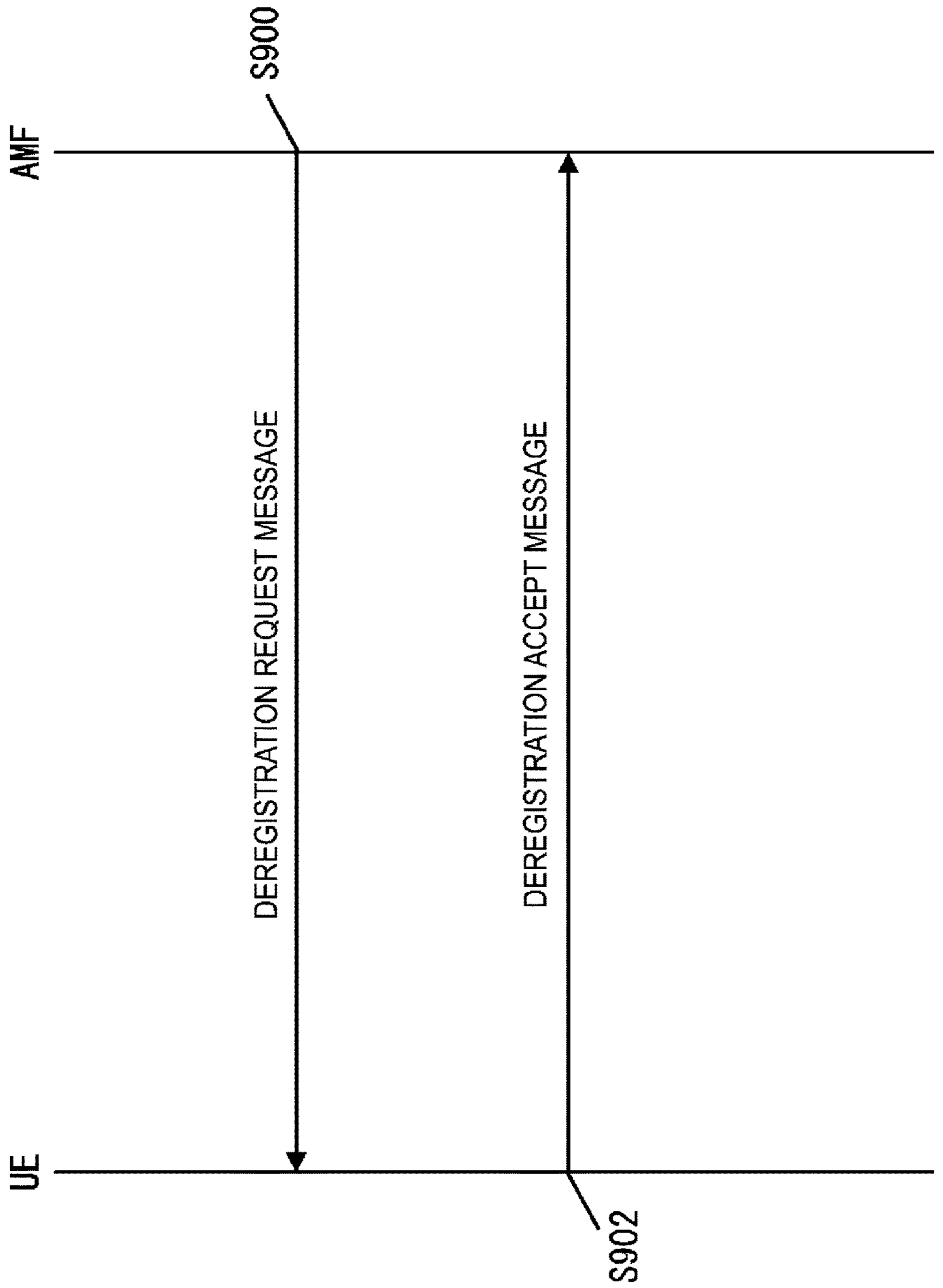
FIG. 9 is a diagram illustrating a network-initiated de-registration procedure.

First, the Network-initiated de-registration procedure will be described with reference to FIG. 9. The network-initiated de-registration procedure is hereinafter also referred to as the present procedure. The network-initiated de-registration procedure is a procedure initiated by the network in the de-registration procedure. Each step of the present procedure will be described below.

First, the AMF transmits a Deregistration request message to the UE via the 5G AN (or the gNB) (S900), and thereby initiates the de-registration procedure.

The AMF may include at least the 31st identification information in the registration accept message for transmission. Note that, by transmitting these pieces of identification information, the AMF may indicate the reason why registration of the UE is canceled, or may indicate that the network needs to be re-selected. In addition, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the onboarding service has been completed, the AMF may include the 31st identification information in the deregistration request message. In addition, in a case that the SNPN information provision procedure has been completed, the AMF may include the 31st identification information in the deregistration request message.

In addition, in a case that the onboarding service has not been completed, the AMF may include the 31st identification information in the deregistration request message. In addition, in a case that the SNPN information provision procedure has not been completed, the AMF may include the 31st identification information in the deregistration request message.

In addition, in a case that the onboarding service has succeeded, the AMF may include the 31st identification information in the deregistration request message. In addition, in a case that the SNPN information provision procedure has succeeded, the AMF may include the 31st identification information in the deregistration request message. In addition, in a case that provision of the SNPN information has succeeded, the AMF may include the 31st identification information in the deregistration request message.

In addition, in a case that the onboarding service has failed, the AMF may include the 31st identification information in the deregistration request message. In addition, in a case that the SNPN information provision procedure has failed, the AMF may include the 31st identification information in the deregistration request message. In addition, in a case that provision of the SNPN information has failed, the AMF may include the 31st identification information in the deregistration request message.

In addition, in a case that a timer managed by the UE and/or the network has expired, the AMF may include the 31st identification information in the deregistration request message. In addition, in a case that registration in which only the onboarding service is available has become no longer enabled, the AMF may include the 31st identification information in the deregistration request message.

In addition, in a case that the AMF cannot provide the SNPN information, the AMF may include the 31st identification information in the deregistration request message. In addition, in a case that the AMF cannot perform the onboarding service, the AMF may include the 31st identification information in the deregistration request message. In addition, in a case that the AMF cannot perform the SNPN information provision procedure, the AMF may include the 31st identification information in the deregistration request message.

In addition, in a case that the onboarding service has been completed, the AMF may include the 31st identification information indicating that the onboarding service has been completed in the deregistration request message. In addition, in a case that the SNPN information provision procedure has been completed, the AMF may include the 31st identification information indicating that the SNPN information provision procedure has been completed in the deregistration request message.

In addition, in a case that the onboarding service has not been completed, the AMF may include the 31st identification information indicating that the onboarding service has not been completed in the deregistration request message. In addition, in a case that the SNPN information provision procedure has not been completed, the AMF may include the 31st identification information indicating that the SNPN information provision procedure has not been completed in the deregistration request message.

In addition, in a case that the onboarding service has succeeded, the AMF may include the 31st identification information indicating that the onboarding service has succeeded, in the deregistration request message. In addition, in a case that the SNPN information provision procedure has succeeded, the AMF may include the 31st identification information indicating that the SNPN information provision procedure has succeeded, in the deregistration request message. In addition, in a case that provision of the SNPN information has succeeded, the AMF may include the 31st identification information indicating that provision of the SNPN information has succeeded, in the deregistration request message.

In addition, in a case that the onboarding service has failed, the AMF may include the 31st identification information indicating that the onboarding service has failed, in the deregistration request message. In addition, in a case that the SNPN information provision procedure has failed, the AMF may include the 31st identification information indicating that the SNPN information provision procedure has failed, in the deregistration request message. In addition, in a case that provision of the SNPN information has failed, the AMF may include the 31st identification information indicating that provision of the SNPN information has failed, in the deregistration request message.

In addition, in a case that a timer managed by the UE and/or the network has expired, the AMF may include the 31st identification information indicating that the timer has expired in the deregistration request message. In addition, in a case that registration in which only the onboarding service is available has become no longer enabled, the AMF may include the 31st identification information indicating that registration in which only the onboarding service is available has become no longer enabled in the deregistration request message.

In addition, by including the 31st identification information in the deregistration request message, the AMF may indicate, to the UE, details indicated by the identification information included in the deregistration request message. In addition, by including the 31st identification information in the deregistration request message, the AMF may disallow details indicated by the identification information included in the deregistration request message, for the UE.

Note that the AMF may select and determine whether to include the 31st identification information in the deregistration request message, based on each piece of received identification information, and/or subscriber information, and/or capability information of the network, and/or an operator policy, and/or a state of the network, and/or registration information of a user, and/or a context stored in the AMF, and/or the like.

By transmitting the deregistration request message based on each piece of received identification information, and/or subscriber information, and/or capability information of the network, and/or an operator policy, and/or a state of the network, and/or registration information of a user, and/or a context stored in the AMF, and/or the like, the AMF may indicate a request for release of the context of the UE.

The UE receives the deregistration request message via the 5G AN (gNB) (S900). The UE may recognize a reason why registration of the UE is canceled, or may perform re-selection of the network, based on the deregistration request message and/or the identification information included in the deregistration request message. In addition, the UE may transmit a Deregistration accept message as a response message for the deregistration request message to the AMF via the 5G AN (gNB), based on the identification information included in the deregistration request message (S902).

In a case that the UE transmits the deregistration accept message, the AMF receives the deregistration accept message via the 5G AN (gNB) (S902). Each apparatus completes the present procedure, based on transmission and/or reception of the deregistration request message and/or the deregistration accept message.

Note that each processing performed by the UE based on reception of each piece of identification information described above may be performed during the present procedure or after completion of the present procedure or may be performed based on completion of the present procedure after completion of the present procedure.

In addition, based on completion of the present procedure, each apparatus may perform processing based on information transmitted and/or received in the present procedure. For example, in a case that update information for configuration information is transmitted and/or received, each apparatus may release the context of the UE. In addition, in a case that the UE transmits and/or receives information indicating that the UE needs to perform re-selection of the network and/or the registration procedure, the UE may initiate re-selection of the network and/or the registration procedure, based on completion of the present procedure.

In addition, the UE may store the identification information received together with the deregistration request message, or may recognize determination of the network, based on completion of the present procedure.

For example, in a case that the UE receives the 31st identification information, the UE may recognize that the onboarding service has been completed. In addition, in a case that the UE receives the 31st identification information, the UE may recognize that the SNPN information provision procedure has been completed.

In addition, in a case that the UE receives the 31st identification information, the UE may recognize that the onboarding service has not been completed. In addition, in a case that the UE receives the 31st identification information, the UE may recognize that the SNPN information provision procedure has not been completed.

In addition, in a case that the UE receives the 31st identification information, the UE may determine whether the onboarding service has been completed. In addition, in a case that the UE receives the 31st identification information, the UE may determine whether the SNPN information provision procedure has been completed.

In addition, in a case that the UE receives the 31st identification information, the UE may recognize that the onboarding service has succeeded. In addition, in a case that the UE receives the 31st identification information, the UE may recognize that the SNPN information provision procedure has succeeded. In addition, in a case that the UE receives the 31st identification information, the UE may recognize that provision and/or acquisition of the SNPN information has succeeded.

In addition, in a case that the UE receives the 31st identification information, the UE may recognize that the onboarding service has failed. In addition, in a case that the UE receives the 31st identification information, the UE may recognize that the SNPN information provision procedure has failed. In addition, in a case that the UE receives the 31st identification information, the UE may recognize that provision and/or acquisition of the SNPN information has failed.

In addition, in a case that the UE receives the 31st identification information, the UE may determine whether the onboarding service has succeeded or failed. In addition, in a case that the UE receives the 31st identification information, the UE may determine whether the SNPN information provision procedure has succeeded or failed. In addition, in a case that the UE receives the 31st identification information, the UE may determine whether provision and/or acquisition of the SNPN information has succeeded or failed.

In addition, in a case that the UE receives the 31st identification information, the UE may recognize that the timer managed by the UE and/or the network has expired. In addition, in a case that the UE receives the 31st identification information, the UE may recognize that registration in which only the onboarding service is available has become no longer enabled.

In addition, in a case that the UE receives the 31st identification information, the UE may recognize that the SNPN information cannot be provided and/or acquired. In addition, in a case that the UE receives the 31st identification information, the UE may recognize that the onboarding service cannot be performed. In addition, in a case that the UE receives the 31st identification information, the UE may recognize that the SNPN information provision procedure cannot be performed.

In addition, in a case that the UE receives the 31st identification information indicating that the onboarding service has been completed, the UE may recognize that the onboarding service has been completed. In addition, in a case that the UE receives the 31st identification information indicating that the SNPN information provision procedure has been completed, the UE may recognize that the SNPN information provision procedure has been completed.

In addition, in a case that the UE receives the 31st identification information indicating that the onboarding service has not been completed, the UE may recognize that the onboarding service has not been completed. In addition, in a case that the UE receives the 31st identification information indicating that the SNPN information provision procedure has not been completed, the UE may recognize that the SNPN information provision procedure has not been completed.

In addition, in a case that the UE receives the 31st identification information indicating that the onboarding service has succeeded, the UE may recognize that the onboarding service has succeeded. In addition, in a case that the UE receives the 31st identification information indicating that the SNPN information provision procedure has succeeded, the UE may recognize that the SNPN information provision procedure has succeeded. In addition, in a case that the UE receives the 31st identification information indicating that provision of the SNPN information has succeeded, the UE may recognize that provision and/or acquisition of the SNPN information has succeeded.

In addition, in a case that the UE receives the 31st identification information indicating that the onboarding service has failed, the UE may recognize that the onboarding service has failed. In addition, in a case that the UE receives the 31st identification information indicating that the SNPN information provision procedure has failed, the UE may recognize that the SNPN information provision procedure has failed. In addition, in a case that the UE receives the 31st identification information indicating that provision of the SNPN information has failed, the UE may recognize that provision and/or acquisition of the SNPN information has failed.

In addition, in a case that the UE receives the 31st identification information indicating that a timer has expired, the UE may recognize that the timer managed by the UE and/or the network has expired. In addition, in a case that the UE receives the 31st identification information indicating that registration in which only the onboarding service is available has become no longer enabled, the UE may recognize that registration in which only the onboarding service is available has become no longer enabled.

In addition, in a case that the UE receives the 31st identification information, the UE may recognize details indicated by the received identification information. In addition, in a case that the UE receives the 31st identification information, the UE may recognize that details indicated by the received identification information are not allowed.

In addition, in a case that the UE receives the 31st identification information, the UE may release or delete the first list. In addition, in a case that the UE receives the 31st identification information, the UE may delete the identification information of the network from the first list.

More specifically, in a case that the UE receives the 31st identification information indicating that the onboarding service has been completed, the UE may release or delete the first list. In addition, in a case that the UE receives the 31st identification information indicating that the SNPN information provision procedure has been completed, the UE may release or delete the first list.

In addition, in a case that the UE receives the 31st identification information indicating that the onboarding service has succeeded, the UE may release or delete the first list. In addition, in a case that the UE receives the 31st identification information indicating that the SNPN information provision procedure has succeeded, the UE may release or delete the first list. In addition, in a case that the UE receives the 31st identification information indicating that provision of the SNPN information has succeeded, the UE may release or delete the first list.

In addition, in a case that the onboarding service has already been completed, the UE may release or delete the first list. In addition, in a case that the SNPN information provision procedure has already been completed, the UE may release or delete the first list. In addition, in a case that acquisition of the SNPN information has already been completed, the UE may release or delete the first list.

In addition, in a case that the onboarding service has already succeeded, the UE may release or delete the first list. In addition, in a case that the SNPN information provision procedure has already succeeded, the UE may release or delete the first list. In addition, in a case that acquisition of the SNPN information has already succeeded, the UE may release or delete the first list.

Here, the identification information of the network may be information for identifying the network in which the UE is currently located. More specifically, in a case that the UE is located in the PLMN, the identification information of the network may be information for identifying the PLMN in which the UE is currently located. Conversely, in a case that the UE is located in the SNPN, the identification information of the network may be information for identifying the SNPN in which the UE is currently located.

For example, in a case that the present procedure is performed in the first network, the identification information of the network may be information for identifying the first network. More specifically, in a case that the present procedure is performed in the first PLMN, the identification information of the network may be information for identifying the first PLMN. In addition, in a case that the present procedure is performed in the first SNPN, the identification information of the network may be information for identifying the first SNPN.

In addition, in a case that the UE receives the 31st identification information, the UE may perform second network selection. In addition, in a case that the UE receives the 31st identification information, the UE may perform the second network selection, and select a target SNPN. In addition, after the UE completes performing the second network selection, the UE may initiate the registration procedure in the new selected network.

More specifically, in a case that the UE receives the 31st identification information indicating that the onboarding service has been completed, the UE may perform the second network selection. In addition, in a case that the UE receives the 31st identification information indicating that the SNPN information provision procedure has been completed, the UE may perform the second network selection.

In addition, in a case that the UE receives the 31st identification information indicating that the onboarding service has succeeded, the UE may perform the second network selection. In addition, in a case that the UE receives the 31st identification information indicating that the SNPN information provision procedure has succeeded, the UE may perform the second network selection. In addition, in a case that the UE receives the 31st identification information indicating that provision of the SNPN information has succeeded, the UE may perform the second network selection.

Conversely, in a case that the UE receives the 31st identification information, the UE may add the identification information of the network to the first list. In addition, in a case that the UE receives the 31st identification information, the UE may create the first list, and add the identification information of the network to the created first list.

More specifically, in a case that the UE receives the 31st identification information indicating that the onboarding service has not been completed, the UE may add the identification information of the network to the first list. In addition, in a case that the UE receives the 31st identification information indicating that the SNPN information provision procedure has not been completed, the UE may add the identification information of the network to the first list.

In addition, in a case that the UE receives the 31st identification information indicating that the onboarding service has failed, the UE may add the identification information of the network to the first list. In addition, in a case that the UE receives the 31st identification information indicating that the SNPN information provision procedure has failed, the UE may add the identification information of the network to the first list. In addition, in a case that the UE receives the 31st identification information indicating that provision of the SNPN information has failed, the UE may add the identification information of the network to the first list.

In addition, in a case that the UE receives the 31st identification information indicating that a timer has expired, the UE may add the identification information of the network to the first list. In addition, in a case that the UE receives the 31st identification information indicating that registration in which only the onboarding service is available has become no longer enabled, the UE may add the identification information of the network to the first list.

In addition, in a case that the onboarding service has not been completed yet, the UE may add the identification information of the network to the first list. In addition, in a case that the SNPN information provision procedure has not been completed yet, the UE may add the identification information of the network to the first list. In addition, in a case that acquisition of the SNPN information has not been completed yet, the UE may add the identification information of the network to the first list.

In addition, in a case that the onboarding service has failed, the UE may add the identification information of the network to the first list. In addition, in a case that the SNPN information provision procedure has failed, the UE may add the identification information of the network to the first list. In addition, in a case that the UE has failed to acquire the SNPN information, the UE may add the identification information of the network to the first list.

Here, the identification information of the network may be information for identifying the network in which the UE is currently located. More specifically, in a case that the UE is located in the PLMN, the identification information of the network may be information for identifying the PLMN in which the UE is currently located. Conversely, in a case that the UE is located in the SNPN, the identification information of the network may be information for identifying the SNPN in which the UE is currently located.

For example, in a case that the present procedure is performed in the first network, the identification information of the network may be information for identifying the first network. More specifically, in a case that the present procedure is performed in the first PLMN, the identification information of the network may be information for identifying the first PLMN. In addition, in a case that the present procedure is performed in the first SNPN, the identification information of the network may be information for identifying the first SNPN.

In addition, in a case that the UE receives the 31st identification information, the UE may re-perform first network selection. In addition, in a case that the UE receives the 31st identification information, the UE may re-perform the first network selection, and select another network different from the network in which the UE is currently located. In addition, after the UE completes re-performing the first network selection, the UE may initiate the registration procedure in the new selected network.

More specifically, in a case that the UE receives the 31st identification information indicating that the onboarding service has not been completed, the UE may re-perform the first network selection. In addition, in a case that the UE receives the 31st identification information indicating that the SNPN information provision procedure has not been completed, the UE may re-perform the first network selection.

In addition, in a case that the UE receives the 31st identification information indicating that the onboarding service has failed, the UE may re-perform the first network selection. In addition, in a case that the UE receives the 31st identification information indicating that the SNPN information provision procedure has failed, the UE may re-perform the first network selection. In addition, in a case that the UE receives the 31st identification information indicating that provision of the SNPN information has failed, the UE may re-perform the first network selection.

In addition, in a case that the UE receives the 31st identification information indicating that a timer has expired, the UE may re-perform the first network selection. In addition, in a case that the UE receives the 31st identification information indicating that registration in which only the onboarding service is available has become no longer enabled, the UE may re-perform the first network selection.

In addition, in a case that the UE receives the 31st identification information, the UE may start a timer. Here, the timer may be a timer indicating a period of time for which the first list is managed. In other words, the UE may release or delete the first list, based on expiration of the timer.

In addition, the timer may be a timer indicating a period of time for which the registration procedure is prohibited. In other words, the UE may initiate the registration procedure, based on expiration of the timer.

Note that a behavior performed in a case that each piece of identification information is received may be performed based on the received piece of identification information. For example, a behavior performed in a case that the 31st identification information is received may be performed based on the received 31st identification information.

In the above-described procedure, by transmitting and/or receiving the deregistration request message, the apparatus in the core network can indicate to the UE to release the configuration information already applied by the UE and indicate to the UE to stop or change the function performed by the UE.

3.2.3.2. UE-Initiated De-Registration Procedure

Figure 10:
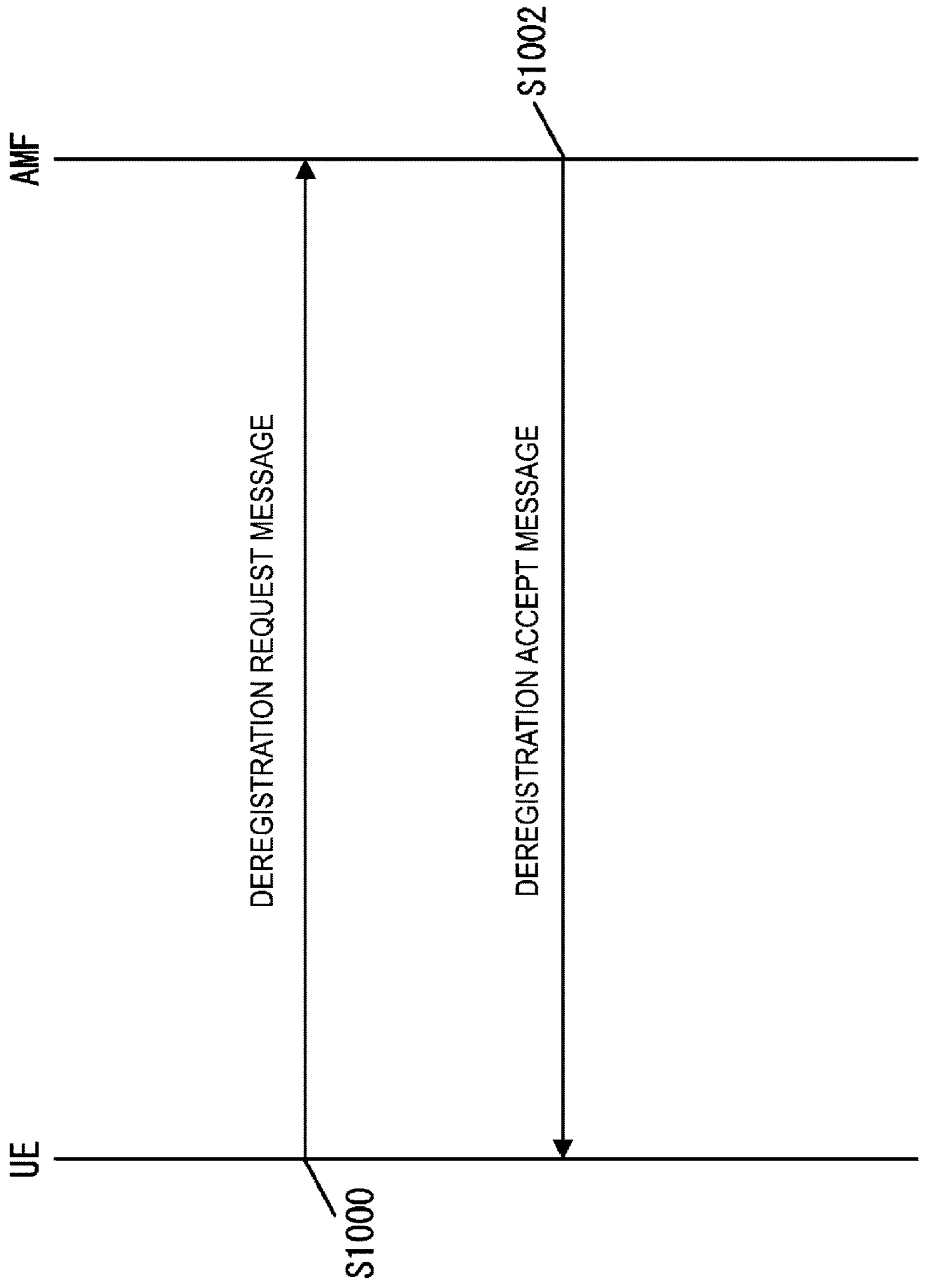
FIG. 10 is a diagram illustrating a UE-initiated de-registration procedure.

First, the UE-initiated de-registration procedure will be described with reference to FIG. 10. The UE-initiated de-registration procedure is hereinafter also referred to as the present procedure. The UE-initiated de-registration procedure is a procedure initiated by the UE in the de-registration procedure. Each step of the present procedure will be described below.

First, the UE transmits a Deregistration request message to the AMF via the 5G AN (or the gNB) (S1000), and thereby initiates the de-registration procedure.

The UE may include at least the 31st identification information in the registration accept message for transmission. Note that, by transmitting these pieces of identification information, the UE may indicate the reason why registration of the UE is canceled, or may indicate that the network needs to be re-selected. In addition, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the onboarding service has been completed, the UE may include the 31st identification information in the deregistration request message. In addition, in a case that the SNPN information provision procedure has been completed, the UE may include the 31st identification information in the deregistration request message.

In addition, in a case that the onboarding service has not been completed, the UE may include the 31st identification information in the deregistration request message. In addition, in a case that the SNPN information provision procedure has not been completed, the UE may include the 31st identification information in the deregistration request message.

In addition, in a case that the onboarding service has succeeded, the UE may include the 31st identification information in the deregistration request message. In addition, in a case that the SNPN information provision procedure has succeeded, the UE may include the 31st identification information in the deregistration request message. In addition, in a case that provision and/or acquisition of the SNPN information has succeeded, the UE may include the 31st identification information in the deregistration request message.

In addition, in a case that the onboarding service has failed, the UE may include the 31st identification information in the deregistration request message. In addition, in a case that the SNPN information provision procedure has failed, the UE may include the 31st identification information in the deregistration request message. In addition, in a case that provision and/or acquisition of the SNPN information has failed, the UE may include the 31st identification information in the deregistration request message.

In addition, in a case that a timer managed by the UE and/or the network has expired, the UE may include the 31st identification information in the deregistration request message. In addition, in a case that registration in which only the onboarding service is available has become no longer enabled, the UE may include the 31st identification information in the deregistration request message.

In addition, in a case that the UE cannot provide and/or acquire the SNPN information, the UE may include the 31st identification information in the deregistration request message. In addition, in a case that the UE cannot perform the onboarding service, the UE may include the 31st identification information in the deregistration request message. In addition, in a case that the UE cannot perform the SNPN information provision procedure, the UE may include the 31st identification information in the deregistration request message.

In addition, in a case that the onboarding service has been completed, the UE may include the 31st identification information indicating that the onboarding service has been completed in the deregistration request message. In addition, in a case that the SNPN information provision procedure has been completed, the UE may include the 31st identification information indicating that the SNPN information provision procedure has been completed in the deregistration request message.

In addition, in a case that the onboarding service has not been completed, the UE may include the 31st identification information indicating that the onboarding service has not been completed in the deregistration request message. In addition, in a case that the SNPN information provision procedure has not been completed, the UE may include the 31st identification information indicating that the SNPN information provision procedure has not been completed in the deregistration request message.

In addition, in a case that the onboarding service has succeeded, the UE may include the 31st identification information indicating that the onboarding service has succeeded, in the deregistration request message. In addition, in a case that the SNPN information provision procedure has succeeded, the UE may include the 31st identification information indicating that the SNPN information provision procedure has succeeded, in the deregistration request message. In addition, in a case that provision and/or acquisition of the SNPN information has succeeded, the UE may include the 31st identification information indicating that provision of the SNPN information has succeeded, in the deregistration request message.

In addition, in a case that the onboarding service has failed, the UE may include the 31st identification information indicating that the onboarding service has failed, in the deregistration request message. In addition, in a case that the SNPN information provision procedure has failed, the UE may include the 31st identification information indicating that the SNPN information provision procedure has failed, in the deregistration request message. In addition, in a case that provision and/or acquisition of the SNPN information has failed, the UE may include the 31st identification information indicating that provision of the SNPN information has failed, in the deregistration request message.

In addition, in a case that a timer managed by the UE and/or the network has expired, the UE may include the 31st identification information indicating that the timer has expired in the deregistration request message. In addition, in a case that registration in which only the onboarding service is available has become no longer enabled, the UE may include the 31st identification information indicating that registration in which only the onboarding service is available has become no longer enabled in the deregistration request message.

In addition, by including the 31st identification information in the deregistration request message, the UE may indicate, to the AMF, details indicated by the identification information included in the deregistration request message. In addition, by including the 31st identification information in the deregistration request message, the UE may disallow details indicated by the identification information included in the deregistration request message, for the AMF.

Note that the UE may select and determine whether to include the 31st identification information in the deregistration request message, based on each piece of received identification information, and/or subscriber information, and/or capability information of the network, and/or an operator policy, and/or a state of the network, and/or registration information of a user, and/or a context stored in the UE, and/or the like.

By transmitting the deregistration request message based on each piece of received identification information, and/or subscriber information, and/or capability information of the UE, and/or a state of the UE, and/or registration information of a user, and/or a context stored in the UE, and/or the like, the UE may indicate a request for release of the context of the UE.

The AMF receives the deregistration request message via the 5G AN (gNB) (S1000). The AMF may recognize a reason why registration of the UE is canceled, based on the deregistration request message and/or the identification information included in the deregistration request message. In addition, the AMF may transmit a Deregistration accept message as a response message for the deregistration request message to the UE via the 5G AN (gNB), based on the identification information included in the deregistration request message (S1002).

In a case that the AMF transmits the deregistration accept message, the UE receives the deregistration accept message via the 5G AN (gNB) (S1002). Each apparatus completes the present procedure, based on transmission and/or reception of the deregistration request message and/or the deregistration accept message.

Note that each processing performed by the AMF based on reception of each piece of identification information described above may be performed during the present procedure or after completion of the present procedure or may be performed based on completion of the present procedure after completion of the present procedure.

In addition, based on completion of the present procedure, each apparatus may perform processing based on information transmitted and/or received in the present procedure. For example, in a case that update information for configuration information is transmitted and/or received, each apparatus may release the context of the UE. In addition, in a case that information indicating that re-selection of the network and/or the registration procedure needs to be performed is transmitted and/or received, the UE may initiate re-selection of the network and/or the registration procedure, based on completion of the present procedure.

In addition, the UE may store the identification information received together with the deregistration request message, or may recognize determination of the network, based on completion of the present procedure.

For example, in a case that the UE transmits the 31st identification information, the UE may recognize that the onboarding service has been completed. In addition, in a case that the UE transmits the 31st identification information, the UE may recognize that the SNPN information provision procedure has been completed.

In addition, in a case that the UE transmits the 31st identification information, the UE may recognize that the onboarding service has not been completed. In addition, in a case that the UE transmits the 31st identification information, the UE may recognize that the SNPN information provision procedure has not been completed.

In addition, in a case that the UE transmits the 31st identification information, the UE may determine whether the onboarding service has been completed. In addition, in a case that the UE transmits the 31st identification information, the UE may determine whether the SNPN information provision procedure has been completed.

In addition, in a case that the UE transmits the 31st identification information, the UE may recognize that the onboarding service has succeeded. In addition, in a case that the UE transmits the 31st identification information, the UE may recognize that the SNPN information provision procedure has succeeded. In addition, in a case that the UE transmits the 31st identification information, the UE may recognize that provision and/or acquisition of the SNPN information has succeeded.

In addition, in a case that the UE transmits the 31st identification information, the UE may recognize that the onboarding service has failed. In addition, in a case that the UE transmits the 31st identification information, the UE may recognize that the SNPN information provision procedure has failed. In addition, in a case that the UE transmits the 31st identification information, the UE may recognize that provision and/or acquisition of the SNPN information has failed.

In addition, in a case that the UE transmits the 31st identification information, the UE may determine whether the onboarding service has succeeded or failed. In addition, in a case that the UE transmits the 31st identification information, the UE may determine whether the SNPN information provision procedure has succeeded or failed. In addition, in a case that the UE transmits the 31st identification information, the UE may determine whether provision and/or acquisition of the SNPN information has succeeded or failed.

In addition, in a case that the UE transmits the 31st identification information, the UE may recognize that the timer managed by the UE and/or the network has expired. In addition, in a case that the UE transmits the 31st identification information, the UE may recognize that registration in which only the onboarding service is available has become no longer enabled.

In addition, in a case that the UE transmits the 31st identification information, the UE may recognize that the SNPN information cannot be provided and/or acquired. In addition, in a case that the UE transmits the 31st identification information, the UE may recognize that the onboarding service cannot be performed. In addition, in a case that the UE transmits the 31st identification information, the UE may recognize that the SNPN information provision procedure cannot be performed.

In addition, in a case that the UE transmits the 31st identification information indicating that the onboarding service has been completed, the UE may recognize that the onboarding service has been completed. In addition, in a case that the UE transmits the 31st identification information indicating that the SNPN information provision procedure has been completed, the UE may recognize that the SNPN information provision procedure has been completed.

In addition, in a case that the UE transmits the 31st identification information indicating that the onboarding service has not been completed, the UE may recognize that the onboarding service has not been completed. In addition, in a case that the UE transmits the 31st identification information indicating that the SNPN information provision procedure has not been completed, the UE may recognize that the SNPN information provision procedure has not been completed.

In addition, in a case that the UE transmits the 31st identification information indicating that the onboarding service has succeeded, the UE may recognize that the onboarding service has succeeded. In addition, in a case that the UE transmits the 31st identification information indicating that the SNPN information provision procedure has succeeded, the UE may recognize that the SNPN information provision procedure has succeeded. In addition, in a case that the UE transmits the 31st identification information indicating that provision of the SNPN information has succeeded, the UE may recognize that provision and/or acquisition of the SNPN information has succeeded.

In addition, in a case that the UE transmits the 31st identification information indicating that the onboarding service has failed, the UE may recognize that the onboarding service has failed. In addition, in a case that the UE transmits the 31st identification information indicating that the SNPN information provision procedure has failed, the UE may recognize that the SNPN information provision procedure has failed. In addition, in a case that the UE transmits the 31st identification information indicating that provision of the SNPN information has failed, the UE may recognize that provision and/or acquisition of the SNPN information has failed.

In addition, in a case that the UE transmits the 31st identification information indicating that a timer has expired, the UE may recognize that the timer managed by the UE and/or the network has expired. In addition, in a case that the UE transmits the 31st identification information indicating that registration in which only the onboarding service is available has become no longer enabled, the UE may recognize that registration in which only the onboarding service is available has become no longer enabled.

In addition, in a case that the UE transmits the 31st identification information, the UE may recognize details indicated by the transmitted identification information. In addition, in a case that the UE transmits the 31st identification information, the UE may recognize that details indicated by the transmitted identification information are not allowed.

In addition, in a case that the UE transmits the 31st identification information, the UE may release or delete the first list. In addition, in a case that the UE transmits the 31st identification information, the UE may delete the identification information of the network from the first list.

More specifically, in a case that the UE transmits the 31st identification information indicating that the onboarding service has been completed, the UE may release or delete the first list. In addition, in a case that the UE transmits the 31st identification information indicating that the SNPN information provision procedure has been completed, the UE may release or delete the first list.

In addition, in a case that the UE transmits the 31st identification information indicating that the onboarding service has succeeded, the UE may release or delete the first list. In addition, in a case that the UE transmits the 31st identification information indicating that the SNPN information provision procedure has succeeded, the UE may release or delete the first list. In addition, in a case that the UE transmits the 31st identification information indicating that provision of the SNPN information has succeeded, the UE may release or delete the first list.

In addition, in a case that the onboarding service has already been completed, the UE may release or delete the first list. In addition, in a case that the SNPN information provision procedure has already been completed, the UE may release or delete the first list. In addition, in a case that acquisition of the SNPN information has already been completed, the UE may release or delete the first list.

In addition, in a case that the onboarding service has already succeeded, the UE may release or delete the first list. In addition, in a case that the SNPN information provision procedure has already succeeded, the UE may release or delete the first list. In addition, in a case that acquisition of the SNPN information has already succeeded, the UE may release or delete the first list.

In addition, in a case that the UE receives the deregistration accept message, the UE may release or delete the first list. In addition, in a case that the UE receives the deregistration accept message, the UE may delete the identification information of the network from the first list.

Here, the identification information of the network may be information for identifying the network in which the UE is currently located. More specifically, in a case that the UE is located in the PLMN, the identification information of the network may be information for identifying the PLMN in which the UE is currently located. Conversely, in a case that the UE is located in the SNPN, the identification information of the network may be information for identifying the SNPN in which the UE is currently located.

For example, in a case that the present procedure is performed in the first network, the identification information of the network may be information for identifying the first network. More specifically, in a case that the present procedure is performed in the first PLMN, the identification information of the network may be information for identifying the first PLMN. In addition, in a case that the present procedure is performed in the first SNPN, the identification information of the network may be information for identifying the first SNPN.

In addition, in a case that the UE transmits the 31st identification information, the UE may perform second network selection. In addition, in a case that the UE transmits the 31st identification information, the UE may perform the second network selection, and select a target SNPN. In addition, after the UE completes performing the second network selection, the UE may initiate the registration procedure in the new selected network.

More specifically, in a case that the UE transmits the 31st identification information indicating that the onboarding service has been completed, the UE may perform the second network selection. In addition, in a case that the UE transmits the 31st identification information indicating that the SNPN information provision procedure has been completed, the UE may perform the second network selection.

In addition, in a case that the UE transmits the 31st identification information indicating that the onboarding service has succeeded, the UE may perform the second network selection. In addition, in a case that the UE transmits the 31st identification information indicating that the SNPN information provision procedure has succeeded, the UE may perform the second network selection. In addition, in a case that the UE transmits the 31st identification information indicating that provision of the SNPN information has succeeded, the UE may perform the second network selection.

In addition, in a case that the UE receives the deregistration accept message, the UE may perform the second network selection. In addition, in a case that the UE receives the deregistration accept message, the UE may perform the second network selection, and select a target SNPN. In addition, after the UE completes performing the second network selection, the UE may initiate the registration procedure in the new selected network.

Conversely, in a case that the UE transmits the 31st identification information, the UE may add the identification information of the network to the first list. In addition, in a case that the UE transmits the 31st identification information, the UE may create the first list, and add the identification information of the network to the created first list.

More specifically, in a case that the UE transmits the 31st identification information indicating that the onboarding service has not been completed, the UE may add the identification information of the network to the first list. In addition, in a case that the UE transmits the 31st identification information indicating that the SNPN information provision procedure has not been completed, the UE may add the identification information of the network to the first list.

In addition, in a case that the UE transmits the 31st identification information indicating that the onboarding service has failed, the UE may add the identification information of the network to the first list. In addition, in a case that the UE transmits the 31st identification information indicating that the SNPN information provision procedure has failed, the UE may add the identification information of the network to the first list. In addition, in a case that the UE transmits the 31st identification information indicating that provision of the SNPN information has failed, the UE may add the identification information of the network to the first list.

In addition, in a case that the UE transmits the 31st identification information indicating that a timer has expired, the UE may add the identification information of the network to the first list. In addition, in a case that the UE transmits the 31st identification information indicating that registration in which only the onboarding service is available has become no longer enabled, the UE may add the identification information of the network to the first list.

In addition, in a case that the onboarding service has not been completed yet, the UE may add the identification information of the network to the first list. In addition, in a case that the SNPN information provision procedure has not been completed yet, the UE may add the identification information of the network to the first list. In addition, in a case that acquisition of the SNPN information has not been completed yet, the UE may add the identification information of the network to the first list.

In addition, in a case that the onboarding service has failed, the UE may add the identification information of the network to the first list. In addition, in a case that the SNPN information provision procedure has failed, the UE may add the identification information of the network to the first list. In addition, in a case that the UE has failed to acquire the SNPN information, the UE may add the identification information of the network to the first list.

In addition, in a case that the UE receives the deregistration accept message, the UE may add the identification information of the network to the first list. In addition, in a case that the UE receives the deregistration accept message, the UE may create the first list, and add the identification information of the network to the created first list.

Here, the identification information of the network may be information for identifying the network in which the UE is currently located. More specifically, in a case that the UE is located in the PLMN, the identification information of the network may be information for identifying the PLMN in which the UE is currently located. Conversely, in a case that the UE is located in the SNPN, the identification information of the network may be information for identifying the SNPN in which the UE is currently located.

For example, in a case that the present procedure is performed in the first network, the identification information of the network may be information for identifying the first network. More specifically, in a case that the present procedure is performed in the first PLMN, the identification information of the network may be information for identifying the first PLMN. In addition, in a case that the present procedure is performed in the first SNPN, the identification information of the network may be information for identifying the first SNPN.

In addition, in a case that the UE transmits the 31st identification information, the UE may re-perform first network selection. In addition, in a case that the UE transmits the 31st identification information, the UE may re-perform the first network selection, and select another network different from the network in which the UE is currently located. In addition, after the UE completes re-performing the first network selection, the UE may initiate the registration procedure in the new selected network.

More specifically, in a case that the UE transmits the 31st identification information indicating that the onboarding service has not been completed, the UE may re-perform the first network selection. In addition, in a case that the UE transmits the 31st identification information indicating that the SNPN information provision procedure has not been completed, the UE may re-perform the first network selection.

In addition, in a case that the UE transmits the 31st identification information indicating that the onboarding service has failed, the UE may re-perform the first network selection. In addition, in a case that the UE transmits the 31st identification information indicating that the SNPN information provision procedure has failed, the UE may re-perform the first network selection. In addition, in a case that the UE transmits the 31st identification information indicating that provision of the SNPN information has failed, the UE may re-perform the first network selection.

In addition, in a case that the UE transmits the 31st identification information indicating that a timer has expired, the UE may re-perform the first network selection. In addition, in a case that the UE transmits the 31st identification information indicating that registration in which only the onboarding service is available has become no longer enabled, the UE may re-perform the first network selection.

In addition, in a case that the UE receives the deregistration accept message, the UE may re-perform the first network selection. In addition, in a case that the UE receives the deregistration accept message, the UE may re-perform the first network selection, and select another network different from the network in which the UE is currently located. In addition, after the UE completes re-performing the first network selection, the UE may initiate the registration procedure in the new selected network.

In addition, in a case that the UE transmits the 31st identification information, the UE may start a timer. In addition, in a case that the UE receives the deregistration accept message, the UE may start the timer.

Here, the timer may be a timer indicating a period of time for which the first list is managed. In other words, the UE may release or delete the first list, based on expiration of the timer.

In addition, the timer may be a timer indicating a period of time for which the registration procedure is prohibited. In other words, the UE may initiate the registration procedure, based on expiration of the timer.

Note that a behavior performed in a case that each piece of identification information is transmitted may be performed based on the transmitted piece of identification information. For example, a behavior performed in a case that the 31st identification information is transmitted may be performed based on the transmitted 31st identification information.

In the above-described procedure, by transmitting and/or receiving the deregistration request message, the apparatus in the core network can indicate to the UE to release the configuration information already applied by the UE and indicate to the UE to stop or change the function performed by the UE.

4. First Embodiment

Next, the first embodiment will be described. The first embodiment is hereinafter referred to as the present embodiment. In the present embodiment, the UE performs a first procedure.

Note that the UE may determine whether to perform the first procedure, based on configuration information of the UE, and/or information received from the network, and/or a mode of the UE, and/or capability information of the UE.

4.1. First Procedure

Figure 6:
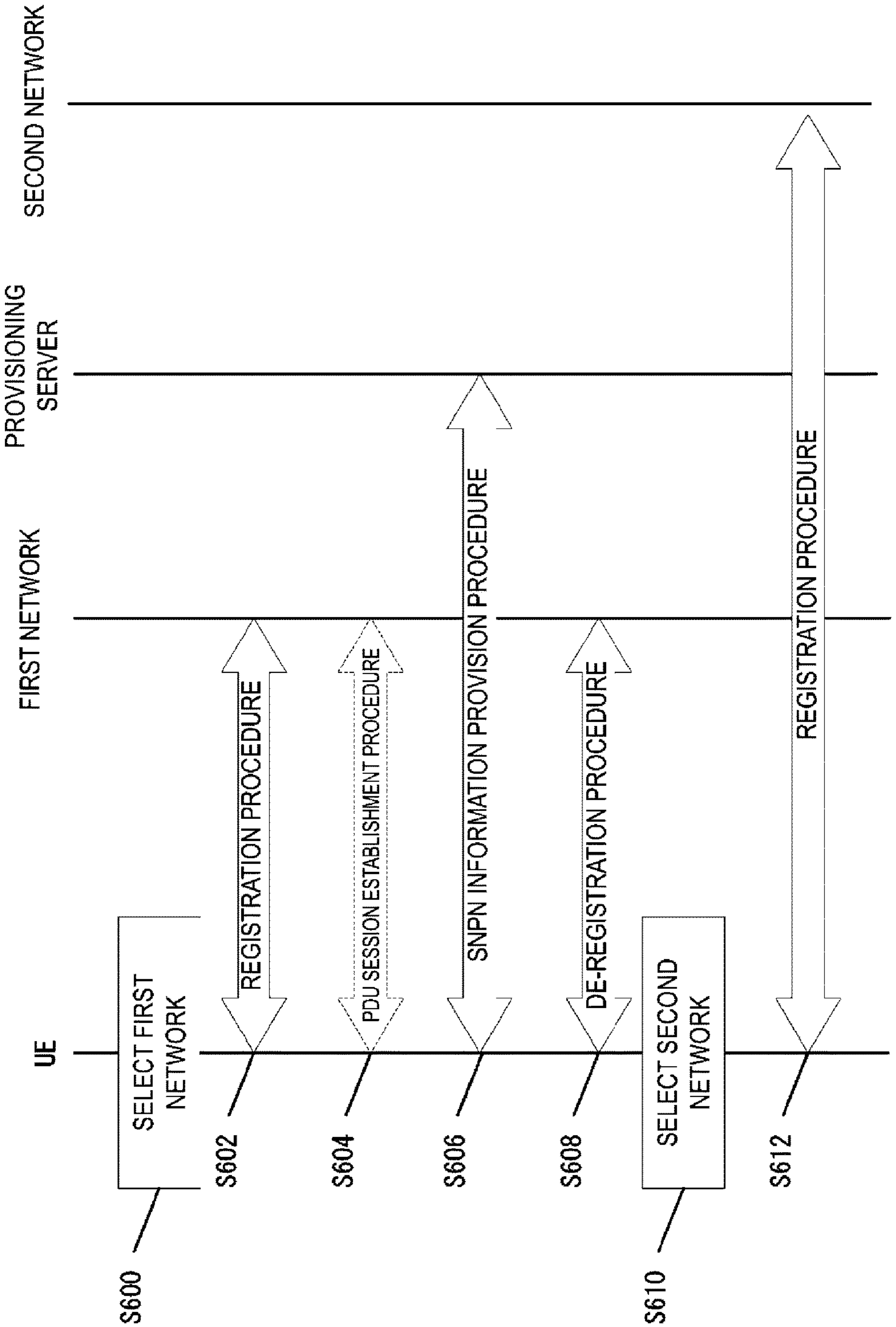
FIG. 6 is a diagram illustrating a first procedure.

Next, the first procedure will be described with reference to FIG. 6. The first procedure is hereinafter referred to as the present procedure. In the first procedure, first, the UE performs first network selection (S600). Next, based on the first network selection, the UE connects to the selected first network, and initiates the registration procedure in the first network (S602). Next, based on the initiation of the registration procedure, each apparatus performs the registration procedure in the first network.

Here, based on completion of the registration procedure, the UE may initiate the PDU session establishment procedure in the first network (S604). In a case that the PDU session establishment procedure is initiated, each apparatus may perform the PDU session establishment procedure in the first network.

Next, based on completion of the registration procedure and/or completion of the PDU session establishment procedure, each apparatus performs the SNPN information provision procedure (S606). Next, based on completion of the SNPN information provision procedure, each apparatus performs the de-registration procedure in the first network (S608).

Next, based on completion of the de-registration procedure, the UE performs second network selection (S610). Next, based on the second network selection, the UE connects to the selected second network, and initiates the registration procedure (S612). Next, based on the initiation of the registration procedure, each apparatus performs the registration procedure in the second network. Through the above process, the first procedure is completed.

Here, the first network may be an SNPN, or may be a PLMN. In addition, the first network may be a network for the onboarding service.

In addition, the second network may be an SNPN. In addition, the second network may be a network to which the UE has been attempting to connect. In addition, the second network may be a target SNPN.

In addition, the second network may be a network different from the first network. Conversely, the second network may be a network the same as the first network.

In addition, the SNPN information provision procedure may be performed between the UE and the provisioning server. Here, the provisioning server may be present in the first network. In addition, the provisioning server may be present in the second network. Conversely, the provisioning server may be present in a network different from both the first network and the second network.

In addition, the PDU session establishment procedure may be a procedure for establishing a PDU session for the SNPN information provision procedure. In other words, the PDU session establishment procedure may be a procedure for establishing a PDU session used in the SNPN information provision procedure. In addition, the PDU session establishment procedure may be a procedure for establishing a PDU session for the onboarding service. In addition, the PDU session establishment procedure may be a procedure for establishing a PDU session used in the onboarding service.

Here, the UE may determine whether to perform the PDU session establishment procedure, based on the identification information transmitted and/or received in the registration procedure. For example, in the registration procedure, in a case that the UE recognizes that use of the SNPN information provision procedure is allowed, the UE may initiate the PDU session establishment procedure. More specifically, in the registration procedure, in a case that the UE recognizes that use of the SNPN information provision procedure via the user plane is allowed, the UE may initiate the PDU session establishment procedure. In addition, in a case that the UE recognizes that use of the SNPN information provision procedure using the PCO or the ePCO is allowed, the UE may initiate the PDU session establishment procedure.

Conversely, in the registration procedure, in a case that the UE recognizes that use of the SNPN information provision procedure via the control plane is allowed, the UE need not initiate the PDU session establishment procedure. More specifically, in the registration procedure, in a case that the UE recognizes that use of the SNPN information provision procedure using the URSP is allowed, the UE need not initiate the PDU session establishment procedure.

In addition, the de-registration procedure may be performed, based on completion of the SNPN information provision procedure. Specifically, each apparatus may perform the de-registration procedure, based on completion of the SNPN information provision procedure. In addition, each apparatus may perform the de-registration procedure, based on success of the SNPN information provision procedure.

In addition, the de-registration procedure may be performed after completion of the SNPN information provision procedure. Specifically, each apparatus may perform the de-registration procedure after completion of the SNPN information provision procedure. In addition, each apparatus may perform the de-registration procedure after succeeding in the SNPN information provision procedure.

Conversely, the de-registration procedure may be performed, not based on completion of the SNPN information provision procedure. Specifically, each apparatus may perform the de-registration procedure, based on expiration of a timer. In addition, each apparatus may perform the de-registration procedure, based on failure of the SNPN information provision procedure.

In addition, the de-registration procedure may be performed before completion of the SNPN information provision procedure. Specifically, in a case that the timer has expired, each apparatus may perform the de-registration procedure. In addition, in a case that the SNPN information provision procedure has failed, each apparatus may perform the de-registration procedure.

In addition, in a case that the SNPN information provision procedure has been completed, the de-registration procedure may be the UE-initiated de-registration procedure. In other words, in a case that the SNPN information provision procedure has been completed, each apparatus may perform the UE-initiated de-registration procedure.

In addition, in a case that the SNPN information provision procedure has succeeded, the de-registration procedure may be the UE-initiated de-registration procedure. In other words, in a case that the SNPN information provision procedure has succeeded, each apparatus may perform the UE-initiated de-registration procedure.

In a case that the onboarding service has been completed, the de-registration procedure may be the UE-initiated de-registration procedure. In other words, in a case that the onboarding service has been completed, each apparatus may perform the UE-initiated de-registration procedure.

In addition, in a case that the onboarding service has succeeded, the de-registration procedure may be the UE-initiated de-registration procedure. In other words, in a case that the onboarding service has succeeded, each apparatus may perform the UE-initiated de-registration procedure.

In addition, in a case that the timer managed by the UE has expired, the de-registration procedure may be the UE-initiated de-registration procedure. In other words, in a case that the timer managed by the UE has expired, each apparatus may perform the UE-initiated de-registration procedure.

Conversely, in a case that the SNPN information provision procedure has not been completed, the de-registration procedure may be the network-initiated de-registration procedure. In other words, in a case that the SNPN information provision procedure has not been completed, each apparatus may perform the network-initiated de-registration procedure.

In addition, in a case that the SNPN information provision procedure has failed, the de-registration procedure may be the network-initiated de-registration procedure. In other words, in a case that the SNPN information provision procedure has failed, each apparatus may perform the network-initiated de-registration procedure.

In addition, in a case that the onboarding service has not been completed, the de-registration procedure may be the network-initiated de-registration procedure. In other words, in a case that the onboarding service has not been completed, each apparatus may perform the network-initiated de-registration procedure.

In addition, in a case that the onboarding service has failed, the de-registration procedure may be the network-initiated de-registration procedure. In other words, in a case that the onboarding service has failed, each apparatus may perform the network-initiated de-registration procedure.

In addition, in a case that the timer managed by the network has expired, the de-registration procedure may be the network-initiated de-registration procedure. In other words, in a case that the timer managed by the network has expired, each apparatus may perform the network-initiated de-registration procedure.

In addition, in a case that registration in which only the onboarding service is available has become no longer enabled, the de-registration procedure may be the network-initiated de-registration procedure. In other words, in a case that registration in which only the onboarding service is available has become no longer enabled, each apparatus may perform the network-initiated de-registration procedure.

In addition, in a case that performing of the procedure in the first procedure ends in failure, each apparatus need not perform subsequent procedures. In this case, based on the failure in performing of the procedure, each apparatus may perform processing based on information included in a control message, or may perform the processing based on the information included in the control message and thereby complete the first procedure.

Specifically, in the registration procedure, in a case that the registration reject message is transmitted and/or received, the UE may perform processing based on information included in the registration reject message, or may perform the processing based on the information included in the registration reject message and thereby complete the first procedure.

In addition, in a case that performing of the procedure in the first procedure ends in failure, each apparatus may perform the first procedure again from the beginning. In this case, based on the failure in performing of the procedure, each apparatus may perform processing based on information included in a control message, or may perform the processing based on the information included in the control message and then re-perform the first procedure from the beginning.

Specifically, in the registration procedure, in a case that the registration reject message is transmitted and/or received, the UE may perform processing based on information included in the registration reject message, or may perform the processing based on the information included in the registration reject message and then re-perform the first network selection.

5. Modifications

A program running on an apparatus according to an aspect of the present invention may serve as a program that controls a Central Processing Unit (CPU) and the like to cause a computer to function in such a manner as to realize the functions of the embodiment according to the aspect of the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such the functions of the embodiment according to an aspect of the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. The "computer-readable recording medium" may be a semiconductor recording medium, an optical recording medium, a magnetic recording medium, a medium dynamically retaining the program for a short time, or any other computer-readable recording medium.

Each functional block or various features of the apparatuses used in the aforementioned embodiment may be implemented or performed on an electric circuit, for example, an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that, with advances in semiconductor technology, a circuit integration technology appears that replaces the present integrated circuits, it is possible for one or multiple aspects of the present invention to use a new integrated circuit based on the technology.

Note that, an aspect of the invention of the present application is not limited to the above-described embodiments. In the embodiment, apparatuses have been described as an example, but an aspect of the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. A configuration in which elements described in the respective embodiments and having mutually the same effects, are substituted for one another is also included.

The invention claimed is:

1. An Access and Mobility Management Function (AMF) in a Stand-alone Non-Public Network (SNPN), the AMF comprising:

a transmission and reception circuitry; and a controller, wherein:

in a case that the transmission and reception circuitry receives, from a User Equipment (UE), a registration request message including information indicating a registration of an onboarding, the onboarding allowing the UE to access the SNPN for providing the UE with SNPN information to enable access to a desired SNPN, the controller initiates a de-registration procedure when a timer started by the controller for an onboarding service of the onboarding expires, and the controller initiates the de-registration procedure by sending a de-registration request message to the UE.

2. The AMF according to claim 1, wherein the controller starts the timer when the UE is in 5GMM-REGISTERED.

3. A communication control method performed by an Access and Mobility Management Function (AMF) in a Stand-alone Non-Public Network (SNPN), the communication control method comprising:

in a case that the AMF receives, from a User Equipment (UE), a registration request message including information indicating a registration of an onboarding, the onboarding allowing the UE to access the SNPN for providing the UE with SNPN information to enable access to a desired SNPN, initiating a de-registration procedure when a timer started by the AMF for an onboarding service of the onboarding expires, wherein:

the AMF initiates the de-registration procedure by sending a de-registration request message to the UE.

* * * * *